US007526446B2

(12) United States Patent
Aguais et al.

(10) Patent No.: US 7,526,446 B2
(45) Date of Patent: Apr. 28, 2009

(54) SYSTEM AND METHODS FOR VALUING AND MANAGING THE RISK OF CREDIT INSTRUMENT PORTFOLIOS

(75) Inventors: Scott Aguais, Newmarket (CA); Barry Belkin, Westchester, PA (US); Victoria Farber, Richmond Hill (CA); Lawrence R. Forest, Jr., McLean, VA (US); Alexander Kreinin, Thornhill (CA); Dan Rosen, Toronto (CA); Steve Suchower, Malvern, PA (US)

(73) Assignee: Algorithmics International, Bridgetown (BB)

( * ) Notice: Subject to any disclaimer, the term of this patent is extended or adjusted under 35 U.S.C. 154(b) by 1265 days.

(21) Appl. No.: 10/051,905

(22) Filed: Jan. 17, 2002

(65) Prior Publication Data
US 2003/0135450 A1    Jul. 17, 2003

Related U.S. Application Data

(63) Continuation-in-part of application No. 10/044,071, filed on Jan. 10, 2002, now abandoned.

(51) Int. Cl.
*G06Q 40/00* (2006.01)
(52) U.S. Cl. .......................... 705/38; 705/37; 705/36; 705/35
(58) Field of Classification Search ............. 705/35–38, 705/40
See application file for complete search history.

(56) References Cited

U.S. PATENT DOCUMENTS

| | | | |
|---|---|---|---|
| 5,892,900 A * | 4/1999 | Ginter et al. | 726/26 |
| 6,014,627 A | 1/2000 | Togher et al. | |
| 6,078,903 A | 6/2000 | Kealhofer | |
| 6,249,775 B1 * | 6/2001 | Freeman et al. | 705/36 R |
| 6,292,788 B1 * | 9/2001 | Roberts et al. | 705/36 T |

(Continued)

OTHER PUBLICATIONS

Derived/matrix pricing for bank loans Walter J Bloomenthal. Commercial Lending Review. New York: Winter 2001/2002. vol. 17, Iss. 1; p. 21, 3 pgs.*

(Continued)

*Primary Examiner*—Frantzy Poinvil
*Assistant Examiner*—Clement Graham
(74) *Attorney, Agent, or Firm*—Duane Morris LLP

(57) ABSTRACT

The present invention relates generally to a system of components, comprising an integrated architecture, which supports calibration of financial models, and the structuring, pricing, mark-to-market valuation, simulation, risk management, and reporting of a variety of credit instruments subject to both credit and market risk (e.g., interest rate, foreign exchange risk). Detailed instrument complexities may be accommodated, by modeling the underlying economic behavior driving the exercise of embedded options and other structural features of credit instruments by implementing detailed economic behavioral models. In one aspect of the present invention, the system comprises a database for storing credit instrument data, a first calibration engine for generating calibration parameters from the credit instrument data, a second pricing engine adapted to calculate the net present values and valuation metrics for the credit instruments by modeling the underlying economic behavior driving the exercise of embedded options and other structural features of the credit instruments, a third engine for performing simulation-based computations, a fourth risk engine for computing risk and reward metrics, and a report generator for generating reports for use in managing risk.

16 Claims, 8 Drawing Sheets

U.S. PATENT DOCUMENTS

| | | | |
|---|---|---|---|
| 6,393,415 B1 * | 5/2002 | Getchius et al. | 707/2 |
| 7,171,385 B1 * | 1/2007 | Dembo et al. | 705/36 R |
| 2002/0052836 A1 * | 5/2002 | Galperin et al. | 705/38 |

OTHER PUBLICATIONS

Aguais et al., "Creating value from both loan structure and price", Commercial Lending Review, 1998, 13(2): 13-24.

Aguais et al., "Incorporating new fixed income approaches into commercial loan valuation", Journal of Lending and Credit Risk Management, 1998, v.80(6): 58-65.

Aguais, S. and L. Forest, "The Future of Risk-Adjusted Credit Pricing in Financial Institutions", The RMA Journal, Nov. 2000, 26-31.

Aguais, S., L. Forest and D. Rosen, "Building a Credit Risk Valuation Framework for Loan Instruments", ARQ, Dec. 2000, 3(3): 21-46.

Asarnow, E., 1994, "Measuring the hidden risks in corporate loans", Commercial Lending Review, 10(1): 24-32.

Aziz, A., 1999a, "Algo Academy Notes", Algo Research Quarterly, 2(1): 65-72.

Aziz, A., 1999b, "Algo Academy Notes", Algo Research Quarterly, 2(2): 51-60.

Aziz, A., 2000, "Algo Academy Notes", Algo Research Quarterly, 3(3): 59-66.

Bank for International Settlements, 1988, International Convergence of Capital Measurement and Capital Standards, Basel Committee on Banking Supervision, July, 58-82.

Bank for International Settlements, 1999, "A new capital adequacy framework", Consultative Paper, Basel Committee on Banking Supervision, June.

Belkin, B., S. J. Suchower and L. Forest, 1998, The effect of systematic credit risk on loan portfolio value-at-risk and loan pricing, CreditMetrics Monitor, April: 17-28.

Belkin, B., S. J. Suchower and L. Forest, 1998, A one-parameter representation of credit risk and transition matrices, CreditMetrics Monitor, October: 46-56.

Belkin et al., Measures of Credit Risk and Loan Value in KPMG's LAS, Oct. 1997.

Brand, L. and R. Bahar, 1998, "Recoveries on defaulted bonds tied to seniority rankings", Special Report Rating Performance 1997, Standard and Poor's, July.

Cossin et al., "Advanced Credit Risk Analysis", (London: Wiley & Sons), 2001, Chapters: 2, 3, 5, 7, 14, 15 and 16.

CreditMetrics: The Benchmark for Understanding Credit Risk, Technical Document, 1997, New York, NY: JP Morgan, Inc.

Das, S. and P. Tufano, 1996, "Pricing credit-sensitive debt when interest rates, credit ratings and credit spreads are stochastic", Journal of Financial Engineering, 5(2): 161-198.

Das, S., (ed.), 1998, Credit Derivatives: Trading and Management of Credit and Default Risk (Wiley Frontiers in Finance), New York: John Wiley & Sons, Chapters: 1 and 2.

Duffie, D. and D. Lando, 1997, "Term structures of credit spreads with incomplete accounting information", Working paper, Graduate School, of Business, Stanford University.

Duffie, D. and K. Singleton, 1999, "Modeling term structures of defaultable bonds", Review of Financial Studies, 12(4): 687-720.

Eales, R. and E. Bosworth, 1998, "Severity of loss in the event of default in small business and larger consumer loans", The Journal of Lending and Credit Risk Management, 80(9): 58-65.

Ginzburg, A., K. Maloney and R. Willner, "Debt Rating Migration and the Valuation of Commercial Loans", Citibank Portfolio Strategies Report, Dec. 1994.

Gordy, M., 1998, "A comparative anatomy of credit risk models", Journal of Banking and Finance, 24(1/2).

Hayt, G., 2000, "How to Price a Credit Derivative", Risk Magazine, 13(2): 60-61.

Iscoe, I., A. Kreinin and D. Rosen, 1999, "An integrated market and credit risk portfolio model", Algo Research Quarterly, 2(3): 21-37.

Jarrow, R. and S. Turnbull, 1995, "Pricing derivatives on financial securities subject to credit risk", Journal of Finance, 50: 53-85.

Jarrow, R. and S. Turnbull, 2000, "The intersection of market and credit risk", Journal of Banking and Finance, 24(1): 271-299.

Jarrow, R., D. Lando and S. Turnbull, 1997, "A Markov model for the term structure of credit risk spreads", The Review of Financial Studies, 10(2): 481-523.

Koyluoglu, H. and A. Hickman, 1998, "Reconcilable differences", Risk Magazine, 11(10): 56-62.

Lando, D., "Some Elements of Rating-Based Credit Risk Modeling", Advanced Fixed-Income Valuation Tools (Wiley) (2000) 193-215.

Lando, D., 1994, "Three Essays on Contingent Claims Pricing", Ph.D. thesis, Graduate School of Management, Cornell University.

Lando, D., 1998, "On Cox Processes and Credit Risky Securities", Review of Derivatives Research, 2(2/3).

Leland, H., 1994, "Corporate Debt Value, Bond Covenants and Optimal Capital Structure", Journal of Finance, 49: 1213-1252.

Li, D., 2000, "On default correlation: a copula function approach", Journal of Fixed Income, 9(3).

Longstaff, F. and E. Schwartz, 1995a, "Valuing credit derivatives", Journal of Fixed Income, 5(1): 6-14.

Longstaff, F. and E. Schwartz, 1995b, "A simple approach to valuing risky fixed and floating rate debt" Journal of Finance, 50(3): 789-819.

LPC Gold Sheets, 2000a, "M&A deals", Loan Pricing Corporation, 14(23): 14.

LPC Gold Sheets, 2000b, "Investment grade deals", loan Pricing Corporation, 14(23): 8-9.

Madan, D. and H. Unal, 1998, "Pricing the Risks of Default", Review of Derivatives Research, 2(2/3): 121-160.

Merton, R., 1974, "On the Pricing of Corporate Debt: the Risk Structure of Interest Rates", Journal of Finance, 29: 449-470.

Shearer, A. and L. Forest, 1998, "Improving Quantification of Risk-Adjusted Performance within Financial Institutions", Commercial Lending Review, 13(4): 48-58.

Stevenson, B., 1996, "The Instrinsic Value of a Commercial Loan: Understanding Option Pricing", Commercial Lending Review, 11(4):4-22.

Tavakoli, J., 1998, Credit Derivatives: A Guide to Instruments and Applications, Wiley Series in Financial Engineering, New York: John Wiley & Sons, Chapters: 1, 2 and 3.

\* cited by examiner

SYSTEM AND METHODS FOR VALUING AND MANAGING THE RISK OF CREDIT INSTRUMENT PORTFOLIOS

This application is a continuation-in-part of U.S. patent application Ser. No. 10/044,071, filed Jan. 10, 2002 now abandoned.

FIELD OF THE INVENTION

The present invention relates generally to risk management systems and methods, and is more specifically directed to systems and methods for managing and measuring credit risk.

BACKGROUND OF THE INVENTION

Risk management systems are commonly employed by financial institutions, resource-based corporations, trading organizations, governments, and other users, to make informed decisions in assessing and managing the risk associated with the operations of those users.

Within the field of risk management, an important factor in successfully managing financial risks and rewards within financial institutions is the effective management of credit risk. Many financial institutions originate and manage a substantial amount of credit risky assets. Wholesale bank loans, corporate bonds and credit derivatives together account for a significant amount of credit exposure in financial institutions worldwide.

Several risk management functions are used to support the measurement and management of credit risk, which typically include (1) assessing obligor (borrower) creditworthiness; (2) analyzing, structuring, valuing and pricing individual credit instruments; (3) measuring and controlling counter-party credit exposures; and (4) measuring and optimizing credit risk across credit portfolios. Within an overall enterprise credit risk framework, the functions of pricing and valuation of credit instruments are particularly important. The framework should support risk/reward analysis during the pre-deal credit origination process, ongoing mark-to-market monitoring of credit positions, and aggregate portfolio analysis.

Various models have been developed and used in prior art credit instrument valuation and pricing systems, however many of these models are applicable only to traded instruments such as corporate bonds and mortgages. For example, some prior art systems have been designed to model and value credit instruments of interest in a portfolio, where the value of each credit instrument under various scenarios is to be determined in a simulation. However, these prior art systems often utilize simplified valuation models for the credit instruments of interest, in which certain assumptions are made for ease of computation, but which do not accurately reflect the complex structure of some credit instruments. As a further example, no-arbitrage pricing techniques have been used in derivative valuation pricing systems since the early 1970s. These techniques as used in prior art pricing systems, however, they have been primarily applied only to traded instruments, and not to non-traded credit instruments such as, for example, corporate and commercial loans.

Credit models that have been described in prior publications may be broadly classified into two main categories, often referred to as the "structural" approach, and the "reduced-form" or "intensity-based" approach. These approaches are described in prior publications are well known in the art; for example, as described in Cossin et al., *Advanced Credit Risk Analysis*, (London: Wiley & Sons), 2001. However, these prior publications do not teach how such approaches are to be applied to accurately price complex non-traded credit instruments, such as loans. In particular, they do not discuss the details of the underlying financial options embedded in those structures, how to model and generate their future cash flows and how to apply those credit models for their valuation or to manage their risk.

Many prior art credit pricing models have dealt only minimally with the pricing and valuation of loans. Loans are typically complicated, custom-structured credit instruments, with state-contingent cash flow structures that vary with changes in the creditworthiness of a non-defaulting borrower (i.e. movements between various credit ratings short of default). The development of effective credit risk pricing models for loans has been slow. While a model having broad applicability is generally desirable, the need to model a substantial number of key product-specific features of loans in detail has made the development of such a model difficult.

Currently, one of the most prevalent methods used in practice for pricing and managing non-traded instruments such as loans applies the concept of RAROC (risk-adjusted return on capital). The RAROC approach attempts to distribute aggregate risk costs down to businesses, products, customers, and ultimately, individual transactions. Measures of static, marginal risk contributions are used in the RAROC approach to allocate capital costs directly to individual loans in relation to a firm's aggregate debt and equity costs. However, since RAROC is not a "no-arbitrage" technique, it does not reconcile the prices of loans with those of similar securities available in the market (such as bonds, other loans and credit derivatives). As a result, RAROC cannot assess comparative business opportunities and arbitrage-like situations arising from relative price mismatches. RAROC is also unable to capture the natural hedges that often motivate the creation of new credit securities.

Furthermore, implementations of the RAROC approach typically are subject to a number of limitations. For example, the approach neglects the state contingency of many loan cash flows, takes a static view of credit risk, generally considers an arbitrary fixed horizon in pricing credit risk, and uses highly subjective parameters in practice.

Financial institutions typically require detailed evaluations of the economic profitability of their bank lending operations, and accurate mark-to-market measures of investment portfolio performance. There is a need for more computationally efficient tools to support pre-deal loan structuring, and means to incorporate detailed mark-to-market valuation of non-traded loans into portfolio simulation models. Commercial loans and other credit instruments often include features such as prepayment rights, draw down options, pricing grids, and term-outs that cause the cash flows from the instruments to vary across variations in obligor credit worthiness. However, these features are not supported by many prior art credit instrument pricing and valuation systems. Corporate bonds and fixed-rate loans require models that measure both credit risk and interest rate risk, including embedded options that are subject to either form of risk. However, prior art credit instrument pricing systems have not assessed loan structures in complete detail, and do not provide computationally efficient and scalable solution algorithms which can be integrated with portfolio simulation and risk management capabilities of risk management systems. Furthermore, many prior art systems do not support the combined assessment of both credit risk and market risk where instruments contain substantial embedded options and structures and accordingly may not be able to price such instruments properly, nor can they support an integrated risk market and credit management solution.

SUMMARY OF THE INVENTION

The present invention relates generally to risk management systems and methods, and is more specifically directed to systems and methods for managing and measuring credit risk.

In one aspect of the present invention, there is provided a system for valuing and managing the risk of a plurality of credit instruments comprising a database for storing credit instrument data; a first calibration engine connected to the database, wherein the first calibration engine generates calibration parameters from the credit instrument data; a second pricing engine connected to the database and the first calibration engine, wherein the second pricing engine is adapted to calculate the net present values and a plurality of valuation metrics for the plurality of credit instruments by modeling the underlying economic behavior driving the exercise of embedded options and other structural features of the plurality of credit instruments; a third engine connected to the second pricing engine for performing simulation-based computations; a fourth risk engine connected to the second pricing engine and the third engine for computing a plurality of risk and reward metrics; and a report generator connected to the fourth risk engine for generating reports for use in managing risk. The system is adapted to determine risk and reward metrics associated with a single credit instrument or a portfolio of credit instruments, which may include for example, risk-adjusted net present value (NPVs), par credit spreads, individual values for embedded options or other structural features, risk and option-adjusted duration, instrument cash flows, valuation sensitivities, portfolio capital, value-at-risk (VaR) and Mark-to-Market (MtM) measures. In preferred embodiments of the invention, these risk and reward metrics can be calculated in accordance with a mode of operation selected from a number of pre-defined modes, including for example, a single transaction mode, a multiple transaction mode, and a batch mode.

In another aspect of the present invention, there is provided a calibration engine for use in a system for valuing and managing the risk of a plurality of credit instruments comprising a first module for generating a plurality of basis instruments from input data relating to the plurality of credit instruments, wherein the input data comprises at least one of prices, ratings, sectors, and terms and conditions; a second module for generating a first term structure of risk-free zero prices and a risk-neutral process for interest rates from the plurality of basis instruments; a third module for generating one or more basic spread matrices from the plurality of basis instruments and the first term structure of risk-free zero prices; a fourth module for generating a second term structure of risk-neutral transition matrices and at least one smoothed credit spread matrix using the first term structure of risk-free zero prices, the fourth module also adapted to develop generators using a transition matrix manager; a fifth module for generating a third term structure of risk-neutral transition matrices for a specific named obligor from the at least one smoothed credit spread matrix, the first term structure of risk-free zero prices, and the second term structure of risk-neutral transition matrices; and a sixth module for generating a plurality of spread volatility matrices. The calibration engine is adapted to develop multiple credit calibrations using external market prices or internal credit risk measures. The credit calibrations embody a matrix of credit spreads or zero coupon prices (per rating and term) and a time-series of risk-neutral credit-state transition matrices that support pricing and valuation analysis. Statistical estimation processes are used to fit these matrices to the market prices of chosen credit instruments. This estimation process is flexible, and multiple approaches to develop the risk-neutral transition matrices may be implemented.

In another aspect of the present invention, there is provided a pricing engine for use in a system for valuing and managing the risk of a plurality of credit instruments comprising a first module for defining a state space; a second module for generating a state space using backward recursion through a discrete lattice, and by modeling the underlying economic behavior driving the exercise of embedded options and other structural features of the plurality of credit instruments; a third cash flow generation module for generating cash flows for the plurality of credit instruments, whereby the credit instruments may be subject to different prepayment or credit state assumptions; and a fourth module connected to the third cash flow generation module for generating a plurality of valuation attributes from the generated cash flows.

The present invention relates generally to a system of components, comprising an integrated architecture, which supports calibration of financial models, and the structuring, pricing, mark-to-market valuation, simulation, risk management, and reporting of a variety of credit instruments subject to both credit and market risk (e.g., interest rate, foreign exchange risk). Detailed instrument complexities may be accommodated, by modeling the underlying economic behavior driving the exercise of embedded options and other structural features of credit instruments by implementing detailed economic behavioral models. Options modeled may include, for example, prepayment rights, draw down options, term-out options, and pricing grids.

The present invention may be implemented in systems designed to support both front-office credit origination and middle-office portfolio management decisions. Furthermore, the present invention may be implemented in systems designed to be computationally efficient, modular, extensible, and scalable to large credit portfolios.

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION OF THE PREFERRED EMBODIMENTS

Figure 1:
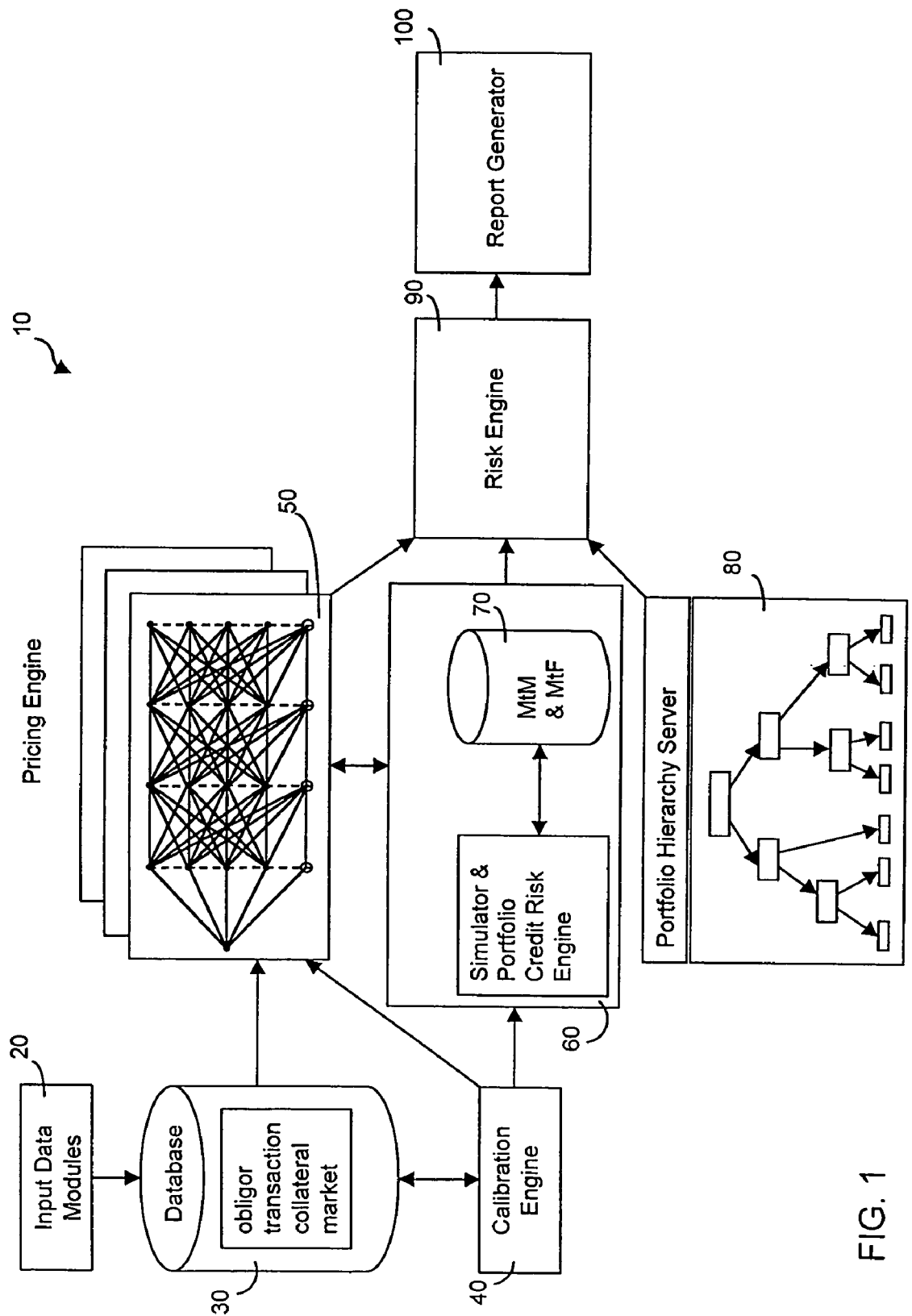
FIG. 1 is a schematic diagram illustrating an embodiment of a system for valuing and managing the risk of credit instrument portfolios designed in accordance with the present invention.

The present invention relates generally to risk management systems and methods, and is more specifically directed to systems and methods for managing and measuring credit risk.

The present invention provides for the structuring, pricing, mark-to-market valuation, simulation, risk management, and reporting of a variety of credit instruments. These credit instruments can be of varying complexity (such as loans, for example). They may also be subject to both credit and market risk (e.g., interest rate, foreign exchange risk).

In preferred embodiments of the invention, ratings-based models are used to price the credit instruments. The theory underlying rating-based models for credit pricing was initially developed in Jarrow et al., "A Markov Model for the Term Structure of Credit Risk Spreads", *Review of Financial Studies*, Vol. 10, No. 2 (1997), and summarized in Lando, D., "Some Elements of Rating-Based Credit Risk Modelling", *Advanced Fixed-Income Valuation Tools* (Wiley) (2000). The potential application of rating-based models (also multi-state models) to value loan structures was discussed previously at a conceptual level (or with much simplified examples) in Ginzburg et al., "Debt rating migration and the valuation of commercial loans", *Citibank Portfolio Strategies Group Report*, December 1994, Aguais et al., "Creating value from both loan structure and price", *Commercial Lending Review*, 13(2), 1998, and Aguais et al., "Incorporating new fixed income approaches into commercial loan valuation", *Journal of Lending and Credit Risk Management*, v. 80(6), 1998. In contrast, preferred embodiments of the present invention provides a framework in which any known calibration model can be used (e.g. such as those described in Lando), but also a modified calibration model as described herein. The present invention is also able to model and generate future cash flows of credit instruments having embedded underlying financial options, a feature not described in any detail in the above references.

The present invention may be implemented in systems designed to provide both distributed, desktop, front-office capabilities for large numbers of users, as well as middle-office batch capabilities to support portfolio risk management. Such systems are also preferably designed to be computationally efficient and scalable to the largest credit portfolios. In preferred embodiments of the invention, the systems comprise key decision-support tools that include the ability to analyze and determine the value of detailed, individual embedded options and loan structures, including assessing various "what if" scenarios both for new and existing credit instruments. When calibrated to a set of traded, credit instrument prices, the system computes Mark-to-Market (MtM) valuations for illiquid credit instruments and assesses various risk and reward sensitivities. The system may be adapted to support advanced credit structuring, pricing, valuation, simulation and reporting capabilities for various credit instruments, and the facility to support a single user or multiple users concurrently.

Referring to FIG. 1, a schematic diagram illustrating an embodiment of a system for valuing and managing the risk of credit instrument portfolios designed in accordance with the present invention and shown generally as 10 is shown.

In preferred embodiments of the present invention, system 10 is a computer application that comprises a set of integrated components in modular form. System 10 comprises a set of input data modules 20 to support the loading and managing of large amounts of information. System 10 utilizes transaction-specific information on detailed terms and conditions (e.g., collateral type and value, amortization schedules, grid pricing structures, loan covenants, etc.) to represent the contractual details of selected credit instruments, which are obtained by input data modules 20 from various data sources (e.g. internal applications, external data sources). Additional information may also be obtained by input data modules 20 from various market sources, as well as sources of specifics of various obligor information, such as an entity's current credit rating for example. Furthermore, to support credit calibration, further instrument terms and conditions information, obligor ratings information and current market price observations are required for large amounts of traded credit instruments.

Attribute mapping routines may be used to convert information obtained from input data modules 20 into one consistent format for storage in a database 30. Database 30 stores obligor data (e.g. credit ratings, financial ratios), transaction data and collateral data (e.g. terms and conditions), and market data (e.g. prices, spreads). It will be obvious to those skilled in the art that data to be stored in database 30 may exist in a single database or other storage means, or distributed across multiple databases or other storage means.

Database 30 is used to input and load credit and terms and conditions information into a calibration engine 40 (to be described in further detail with reference to FIG. 2A) and a pricing engine 50 (to be described in further detail with reference to FIG. 3A). Subsequent output from calibration engine 40 may be stored in database 30 and also used by simulation and portfolio credit risk engine 60 or pricing engine 50. Subsequent output from pricing engine 50 may be used by simulation and portfolio credit risk engine 60. Simulation engine 60 performs further simulation-based computations, and may store various mark-to-market (MtM) and mark-to-future (MtF) valuation and exposure measures in a memory device 70 or a database.

Definition, sorting, and aggregation of different portfolio hierarchies across instruments, obligors, geographies, industries, or other sorting criteria are performed by a portfolio hierarchy server 80.

Outputs from pricing engine 50, simulation and portfolio credit risk engine 60, and portfolio hierarchy server 80 are provided to a risk engine 90. Risk engine 90 is used to determine one or more desired risk and reward metrics associated with a single credit instrument or one or more portfolios of credit instruments. In particular, we can determine these metrics for any portfolio, or multiple portfolios received from portfolio hierarchy server 80 without further simulation or valuation. The risk and reward metrics can be used to support decision-making, and may include for example, risk-adjusted net present value (NPVs), par credit spreads, individual values for embedded options or other structural features, risk and option-adjusted duration, instrument cash flows, valuations sensitivities, portfolio capital, value-at-risk (VaR), Mark-to-Market (MtM) measures, marginal risk and risk contributions. Risk engine 90 may also be programmed to perform real-time "what-if" scenario simulation and analysis.

Output from risk engine 90 may be used to generate reports using report generator 100. Report generator 100 can be used to define and generate standard and/or user-defined reports. Report generator 100 is able to query databases (e.g. database 30) and utilize functions of the portfolio hierarchy server 80. In variant embodiments of the invention, system 10 may be embodied in a web-based implementation or other implementation to support a large number of users both in front-office and middle-office applications, and reports can by customized for different users and distributed to those users by system 10.

In applications where system 10 supports a large number of users in middle-office applications, the risk and reward metrics can be calculated in accordance with a mode of operation selected from a number of pre-defined modes, including for example:

(i) single transaction mode: transaction-by-transaction basis in interactive mode;

(ii) multiple transaction mode: for multiple transactions in interactive mode; and (iii) batch mode: for large numbers of credit transactions in a non-interactive mode.

System 10 is designed to support both valuation and risk management functions. System 10 is equipped with simulation capabilities, including the ability to generate economic scenarios, make calls to the pricing engine 50 of system 10, and generate MtF data. As the architecture of system 10 in preferred embodiments of the invention is modular, multiple pricing engines working in parallel may be used. This supports the detailed analysis of portfolio credit risk, including the integration of credit and market risk. In an embodiment of the present invention, an overall workflow layer with various HTML-based user interface modules is used to control and execute various user-defined commands across various combinations of the components of system 10.

Figure 2A:
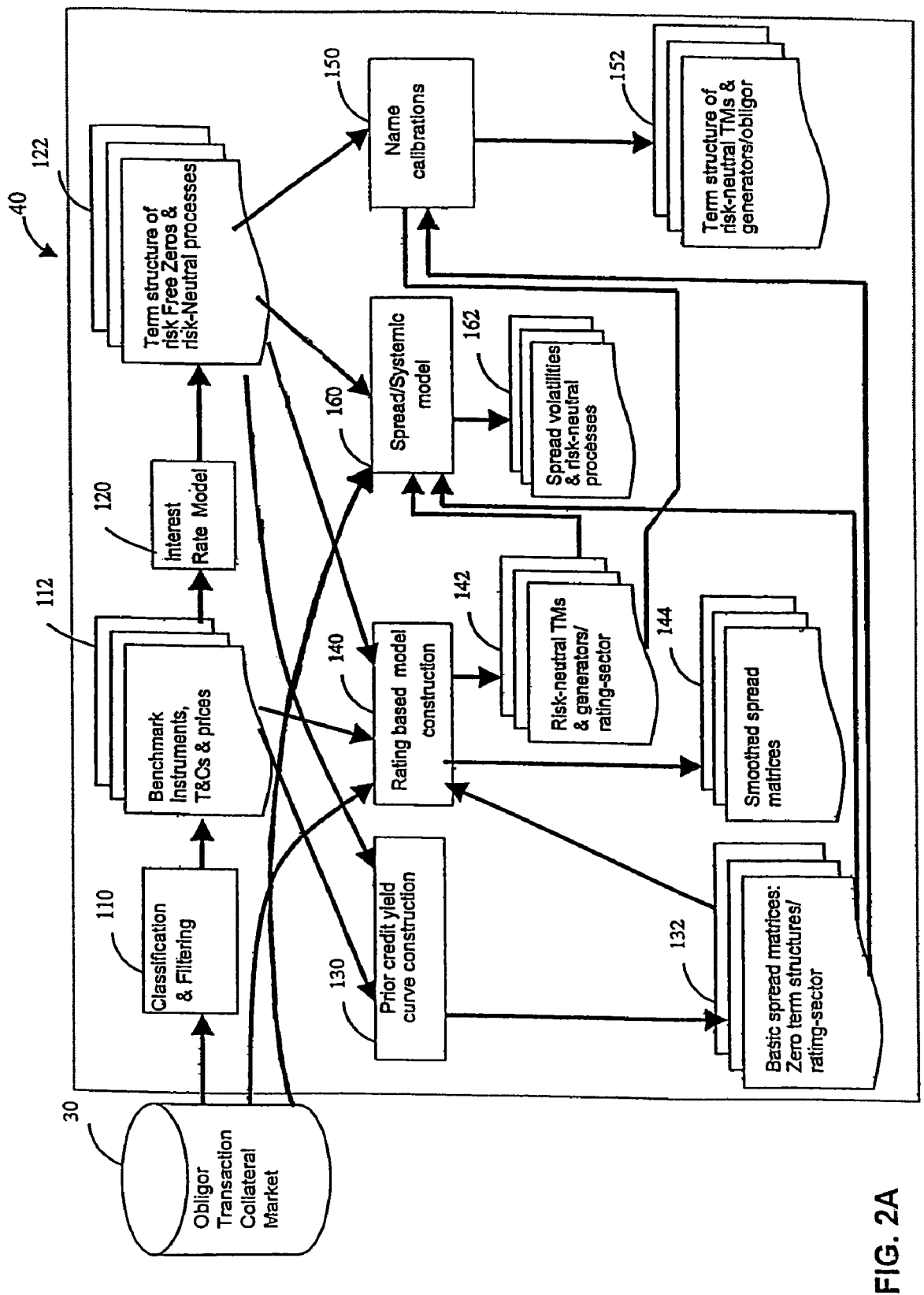
FIG. 2A is a data flow diagram illustrating the processes performed by a credit calibration engine in an embodiment of the present invention.

Referring to FIG. 2A, a data flow diagram illustrating the processes performed by a calibration engine 40 (FIG. 1) in an embodiment of the present invention, also referred to herein as a credit calibration engine, is shown. The processes performed by calibration engine 40 may be performed by separate modules, and thus can be implemented with its own modular architecture.

Input data covering obligor, transaction, collateral, and market data is obtained from database 30. A set of additional modules are then used to develop calibration parameters. The modules of calibration engine 40 perform the following processes:

(a) Classification and Filtering:

A set of standardized instruments are used in the classification and filtering process 110, including potentially any credit instrument with observed prices, but starting usually with bonds or credit derivatives. For these instruments, the prices, ratings, sectors and detailed terms and conditions are received as input. The output of this process is a set of risk-free "basis" or benchmark instruments 112 arrayed across rating, sector and term. Various business rules to undertake a filtering process may be used, including for example, rules for averaging, rules for deleting outliers, rules for placing observations in various buckets, etc.

(b) Interest Rate Model:

The inputs for this interest rate modeling process 120 are a set of risk-free "basis" instruments 112. The output is a term structure 122 of risk-free zero-prices and the specification of a risk-neutral process for interest rates. The module programmed to perform interest rate modeling process 120 utilizes calibration libraries with various known yield curve modeling techniques such as Nelson-Siegel, Svenson, B-splines and bootstrapping. Libraries of interest rate models such as HJM, Hull-White, and Affine models, for example, may also be implemented along with various econometric estimation routines.

(c) Prior Yield Curve Construction:

The purpose of the prior yield curve construction process 130 is to strip coupons out of the credit instruments being used by calibration engine 40, and to develop a robust statistical estimation of zeros at standardized terms. The inputs to the module programmed to perform prior yield curve construction process 130 are a set of "basis" instruments 112 and their prices for each rating and sector, along with the risk-free term structure 122. The output of the prior yield curve construction process 130 is one or more "basic spread matrices" 132, which is a term structure of zero instruments arrayed by ratings and sectors. Calibration libraries with yield curve models (e.g., Nelson-Siegel, Svenson, B-splines and bootstrapping) and intensity models are used in the prior yield curve construction process 130.

(d) Rating Based Model Construction:

The rating based model construction process 140 develops the basic underlying credit variable used by pricing engine 50 (FIG. 1). The main inputs are the basic spread matrices for a term-structure of zero prices 132 and an empirical transition matrix which is used as a "prior" in the estimation stored in database 30. The output is a term-structure of risk-neutral transition matrices (TMs) 142 and a smoothed credit spread matrix 144 derived from them. The module programmed to perform the rating based model construction process 140 essentially solves a global optimization problem with structural constraints. The module also implements a set of flexible tools to develop this calibration including: multiple models for loss-give-default (e.g. recovery of treasury, recovery of par or recovery of market value), and multiple transformation functions for the empirical transistion matrices (e.g. Jarrow-Lando-Turnbull, Kijima & Komoribayashi, CreditMetrics), for example.

This module can also develop generators using what is called a "transition matrix manager" (TMM). TMM is a novel solution in the area of credit risk. The problem that the TMM solves can be summarized as follows: Given an annual (or other specific term) transition matrix, compute transition probabilities for arbitrary time horizons, possibly smaller than one year. Simple computation of the root of the annual transition matrix may result in a matrix with negative elements. Therefore, this method is unacceptable since the resulting matrix cannot represent transition probabilities for credit migration. A similar situation exists when taking the logarithm of the annual transition matrix in computing a generator.

The approach developed in accordance with the present invention is based on the idea of regularization of the matrix. Namely, a family of algorithms is suggested that compute a close approximation of the transition matrices and their generators. The root or logarithm of a given annual transition matrix is then transformed into a valid transition matrix or generator. This transformation is based on projection of each row onto an appropriate set in a Euclidean space. The methodology applied by the TMM is discussed in greater detail below.

Transition Matrix Manager

The regularization problem: Pricing credit risky securities requires the computation of transition probabilities over time intervals of less than one year. The time homogeneity assumption in this case leads to the problem of finding the transition matrix X such that $$X^t = A, t > 1$$

where A is the annual transition matrix and t is the number of time periods per year (e.g., t=12 for a monthly transition matrix).

We define the set of transition matrices, TM(n), to consist of all matrices, $A = \|a_{ij}\|$, of dimension n×n that satisfy $$\sum_{i=1}^{n} a_{ij} = 1 \tag{1}$$

Calculating $$X = A^{1/t} = \exp\left(\frac{1}{t}\ln(A)\right)$$

may result in a matrix that has negative entries and, thus, X may not belong to the set TM(n). Note that if there is a generator G, satisfying $e^G = A$, then $$\tilde{X} = \exp\left(\frac{1}{t}\tilde{G}\right)$$

is a member of the set TM(n). However, in the vast majority of practical cases, the annual transition matrix A does not have a generator. Here, we introduce a framework that allows one to solve this problem by regularization.

The regularization problem can be described in this way: Find a transition matrix X that, when raised to the power t, most closely matches the annual transition matrix A. In mathematical terms, this problem may be formally stated as follows:

Problem BAM: Best approximation of the annual transition matrix

Find $\tilde{X} \in TM(n)$ such that $$\|X^t - A\| = \min_{X \in TM(n)} \|X^t - A\|$$

where $\|.\|$ is a suitable norm in the space of n×n matrices.

Since $\tilde{X}$ is raised to a power greater than one, Problem BAM is a high-dimensional, constrained non-linear optimization problem whose solution is computationally intensive.

One heuristic approach that avoids these computations is based on the following simplification of the problem:

Problem QOM: Quasi-optimization of the root matrix

Find $\hat{X} \in TM(n)$ such that $$\|\hat{X} - A^{1/t}\| = \min_{X \in TM(n)} \|X - A^{1/t}\|$$

Thus, problem QOM finds the transition matrix that is as close as possible to the fractional root of the annual transition matrix, as given by $$A^{1/t} = \exp\left(\frac{1}{t}\ln(A)\right).$$

Comparing problems BAM and QOM suggests that $\hat{X}$ and $\tilde{X}$ should be close to each other; for this reason, it is natural to call $\hat{X}$ a quasi-solution to problem BAM.

The second heuristic approach uses the generator as the object of regularization. First, define the set of generator matrices, G(n), consisting of all matrices of dimension n×n that satisfy $$\sum_{i=1}^{n} g_{ij} = 0 \quad (2)$$

and $g_{ii} < 0$. Consider the problem:

Problem QOG: Quasi-optimization of the generator

Find $\hat{G} \in G(n)$ such that $$\|\hat{G} - \ln(A)\| = \min_{X \in G(n)} \|X - \ln(A)\|$$

Problems BAM and QOG are related under the assumption that $$\exp\left(\frac{1}{t}\hat{G}\right)$$

is close to $\tilde{X}$, and thus the matrix $\hat{G}$ can also be viewed as a quasi-solution to problem BAM. Again, problem QOG is much more attractive than problem BAM in a computational sense.

Figure 2B:
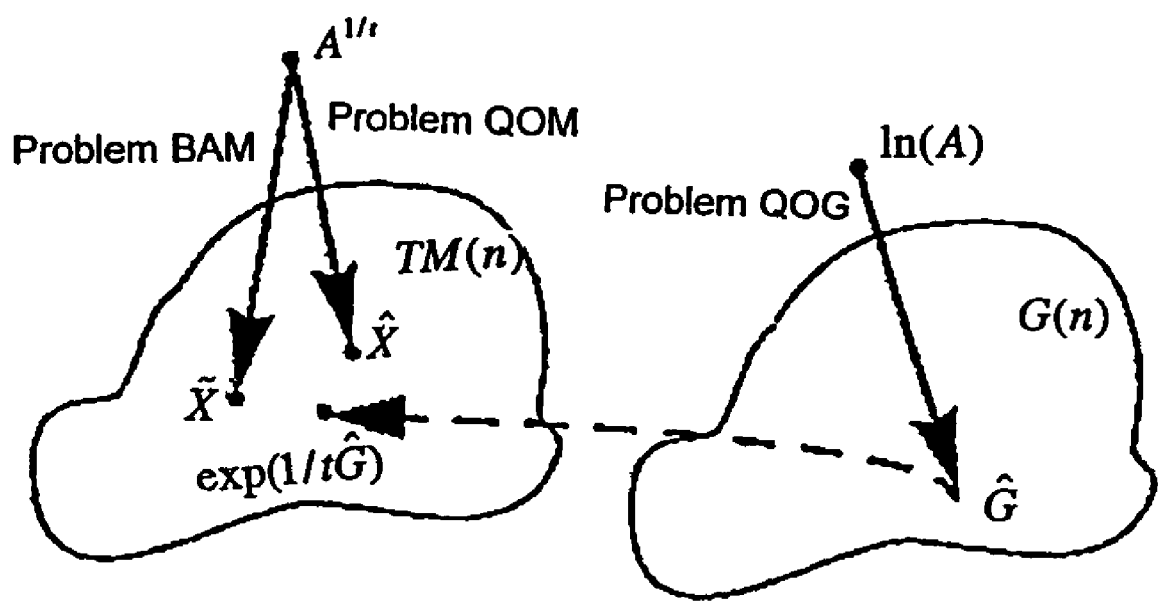
FIG. 2B is a graph illustrating relationships between quasi-optimization problems.

FIG. 2B illustrates the relationships among the above three problems.

When $A^{1/t}$ is not a valid transition matrix, problems BAM and QOM find solutions in TM(n) that are as close as possible to the root matrix. Similarly, when ln(A) is not a valid generator, problem QOG finds the closest possible generator matrix G. Exponentiation of the generator then yields a valid transition matrix that is close to $A^{1/t}$.

Solving problem QOM: To solve problem QOM, we use the fact that the set of transition matrices, TM(n), can be represented as a Cartesian product of n identical n-dimensional simplices. That is, each row of the transition matrix satisfies Equation 1 and thus it belongs to the n-dimensional simplex, Sim(n), defined as follows:

$$Sim(n) = \left\{ (x_1, \ldots, x_n) \in R^n, \sum_{i=1}^{n} x_i = 1, x_i \geq 0 \right\} \quad (3)$$

Furthermore, note that Sim(n) is contained in the hyperplane H(n)

$$H(n) = \left\{ (x_1, \ldots, x_n) \in R^n, \sum_{i=1}^{n} x_i = 1 \right\}$$

Suppose that we use the Euclidean norm to measure the distance between any two points x and y in $R^n$:

$$dist(x,y) = \sqrt{\sum_{i=1}^{n} (y_i - x_i)^2}, \quad x, y \in R^n$$

Then problem QOM can essentially be solved on a row-by-row basis by projecting a point $a \in R^n$ (i.e., a row of the matrix $A^{1/t}$) onto the simplex defined in Equation 3. That is, problem QOM can be reduced to n independent instances of the following distance minimization problem:

Problem DMPM: Distance minimization problem for the root matrix

For a given point $a \in R^n$, $a = (a_1, \ldots a_n)$, find $x^* \in Sim(n)$ such that $$dist(a, x^*) = \min_{X \in Sim(n)} dist(a, x)$$

The following algorithm can be used to solve the problem, with the geometrical proof of convergence provided.

Step 1. Find the projection b of the point a on the hyperplane H(n): set $b_1 = a_i - \lambda$, where $$\lambda = \frac{1}{n}\left(\sum_{i=1}^{n} a_i - 1\right)$$

Step 2. If all the coordinates of b are non-negative then stop; b is the solution to problem DMPM.

Step 3. Let $\hat{a} = \pi(b)$ where $\pi$ is a permutation that orders the coordinates of b in descending sequence.

Step 4. Compute $$C_k = \sum_{i=1}^{k} \hat{a}_i - k \cdot \hat{a}_k$$

for k=1,2, ... ,n. The sums $C_k$ satisfy $0 \leq C_1 \leq C_2 \leq \ldots \leq C_n$.

Step 5. Find $k^* = \max\{k: k \geq 1, C_k \leq 1\}$.

Step 6. Construct the vector $\hat{x} \in \text{Sim}(n)$ as follows. For all $j > k^*$ set $\hat{x}_j = 0$, and for $j \leq k^*$ set $$\hat{x}_j = \hat{a}_j + \frac{1}{k^*}\left(1 - \sum_{i=1}^{k^*} \hat{a}_i\right)$$

Step 7. Apply the inverse permutation $\pi^{-1}$ to $\hat{x}$; $\pi^{-1}(\hat{x})$ is the solution to problem DMPM.

The correctness of the algorithm above follows from the following key propositions.

Proposition 1: Let $a = (a_1, \ldots, a_n)$ be the initial point and let $x^* = (x_1^*, \ldots, x_n^*)$ be the optimal solution to problem DMPM. Then if $a_1 \geq \ldots \geq a_n$, then $x_1^* \geq \ldots \geq x_n^*$.

Proposition 1 states that the elements of the optimal solution are ordered in the same sequence as those of the initial point. This allows us to consider only the case where the coordinates of a are ordered, without loss of generality.

Proposition 2: If b is the projection of a on H(n) and $b_k < 0$ some k, then $x_j^* = 0$ for j=k, ... , n.

Proposition 2 states that, if after projection on the hyperplane, some of the coordinates are negative, then, in the optimal solution these coordinates equal zero. This allows us to reduce the original problem to a discrete optimization problem as follows.

With $\lambda$ obtained as in Step 1 of the algorithm, define the function $$f(l) = l \cdot \lambda^2 + \sum_{i=l+1}^{n} a_i^2$$

for $l = 1, 2, \ldots, n$ (note that $\sum_{i=k}^{m} a_i^2 \equiv 0$ for $k < m$).

The solution of the distance minimization problem can be obtained from solving:

min f(l)

s.t.

$$l \cdot \lambda + \sum_{i=1}^{l} a_i = 1$$

$\lambda + a_l \geq 0$, l=1, ... , n $l \in Z^+$

The solution $l^*$ to this problem determines the optimal number of coordinates $k^*$ to be equal to zero in Step 5.

Proposition 3: The objective function f(l) is monotonic (i.e., f(l)>f(l+1))).

Proposition 3 follows from the identity $$f(m) = f(m+1) + \frac{1}{m \cdot (m+1)} \cdot (1 - T_m)^2$$

where $$T_m = \sum_{i=1}^{m} a_i - m \cdot a_{m+1}$$

From Proposition 3, it follows that the optimal solution to the above problem is $$l^* = \max\left\{l; 1 \leq l \leq n, la_l \geq \sum_{i=1}^{l} a_i - 1\right\}$$

This yields an $l^*$ equal to $k^*$, as calculated in Step 5 of the algorithm.

Note that problem DMPM can also be solved in an iterative manner. In this case, we simply replace Step 3 by:

Step 3. Fix any negative elements of b equal to zero, set a=b and go to Step 1 (do not update any elements once they have been fixed to zero).

The iterative algorithm stops after m steps where m does not exceed the size of the vector a.

Solving problem QOG: Problem QOG is different from problem QOM in a geometrical sense. While the space of the transition matrices, TM(n), is a Cartesian product of simplices, the space of their generators, G(n), is a Cartesian product of n-dimensional cones. Each row of a generator has the property that its elements sum to zero and non-diagonal elements are non-negative (Equation 2). By permuting the row elements, one can always represent them as a point in a standard cone, K(n), defined by $$K(n) = \left\{(x_1, \ldots, x_n) \in R^n, \sum_{i=1}^{n} x_i = 0, x_1 \leq 0, x_i \geq 0, \text{ for } i \geq 2\right\} \quad (4)$$

Note that K(n) is contained in the hyperplane $\hat{H}(n)$:

$$\hat{H}(n) = \left\{ (x_1, \ldots, x_n) \in R^n, \sum_{i=1}^{n} x_i = 0 \right\}$$

In a manner similar to problem QOM, problem QOG can be solved on a row-by-row basis by projecting a point $a \in R^n$ (i.e., a row of the matrix ln(A)) onto the cone defined in Equation 4. Thus, problem QOG can be reduced to n independent instances of the following distance minimization problem:

Problem DMPG: Distance minimization problem for the generator

For a given point $a \in R^n$, $a = (a_1, \ldots a_n)$, find $g^* \in K(n)$ such that $$\text{dist}(a, g^*) = \min_{g \in K(n)} \text{dist}(a, g)$$

The optimal solution to problem DMPG can be obtained as follows:

Step 1. Let b be the projection of a on $\hat{H}(n)$: set $b_i = a_i - \lambda$, where $$\lambda = \frac{1}{n} \left( \sum_{i=1}^{n} a_i \right)$$

Step 2. Let $\hat{a} = \pi(b)$, where $\pi$ is a permutation that orders the coordinates of b in descending sequence.

Step 3. Find $l^*$, the smallest integer $2 \leq l \leq n-1$ that satisfies $$(n - l + 1)\hat{a}_{l+1} \geq \hat{a}_1 + \sum_{i=0}^{n-(l+1)} \hat{a}_{n-i}.$$

Step 4. Let $\mathfrak{S} = \{i : 2 \leq i < l^*\}$. Construct the vector $\hat{g} \in K(n)$ as follows. For all $i \in \mathfrak{S}$ set $\hat{g}_i 0$, and set $$\hat{g}_i = \hat{a}_i - \frac{1}{(n - l^* + 1)} \sum_{j \notin \mathfrak{S}} \hat{a}_j$$

otherwise.

Step 5. Apply the inverse permutation $\pi^{-1}$ to $\hat{g}$; $\pi^{-1}(\hat{g})$ is the solution to problem DMPM.

The correctness of the above algorithm can be proved in a manner similar to that for the case of DMPM. An iterative implementation is possible in this case as well.

Other regularization methods as known in the art may also be used by system 10 of the present invention (e.g. Stromquist, Araton et al.)

Approximating the root of the annual transition matrix yields satisfactory results in at least some cases. The use of quasi-optimization is preferred in those cases by its high precision and computational simplicity.

(e) Name calibration: Referring again to FIG. 2A and to the description of calibration engine 40, the name calibration process 150 uses as inputs a basic spread matrix 132 (or a smoothed credit spread matrix 144 [not shown]) (the term structures of zero-prices), the risk-neutral transition matrices 142 and a zero-price term structure 122 for a specific named obligor. The output is a new term structure 152 of risk-neutral transition matrices for that specific named obligor along with a smoothed "name" credit spread matrix or term structure [not shown]. The module programmed to perform the name calibration process 150 implements various methods for solving the global optimization problem (similar to those solved by rating based model construction process 140) with some data processing and structure constraints depicting the specific term structure of the named obligor. To implement this name calibration, the user must choose from the various methods, how to represent the "specific risk model", the loss given default model, the matrix transformation, the weight and constraints settings, and the coupon adjustment process.

(f) Spread/systemic model: The purpose of the spread/systemic process 160 is to develop a robust specification of spread volatilities representing the unobserved processes. The calibration inputs to this process are the risk-free term structure 122, credit spread matrices 132, risk-neutral transition matrices 142, and a time series of credit spreads, default probabilities or option prices [not shown]. The output is spread volatility matrices by rating and sector and risk-neutral processes for the spread or systemic factors 162. The module programmed to perform the spread/systemic process 160 uses libraries of various stochastic processes and also provides econometric routines.

All outputs of the calibration engine 40 may be stored in database 30 (or in some other storage device or database).

Figure 3A:
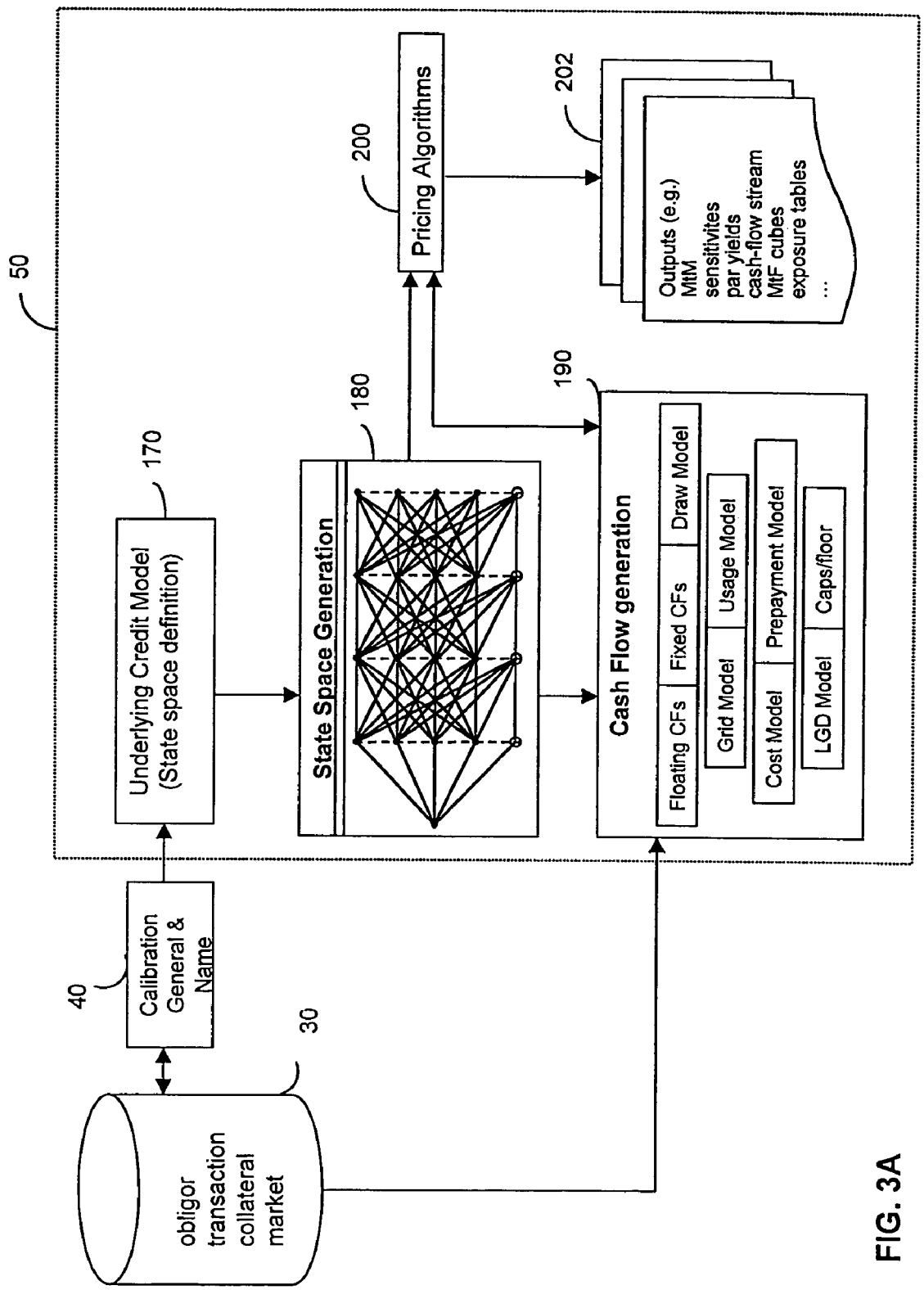
FIG. 3A is a data flow diagram illustrating the processes performed by a pricing engine in an embodiment of the present invention.

Referring to FIG. 3A, a data flow diagram illustrating the processes performed by a pricing engine 50 (FIG. 1) in an embodiment of the present invention is shown. Pricing engine 50 can calculate net present values (NPVs) and a set of additional valuation metrics for a variety of credit instruments using known numerical techniques from option theory. For example, in one embodiment of the invention, a technique for backward recursion through a discrete lattice that depicts future possible states of the world for three risk factors (interest rate risk, obligor credit state, and credit spread) may be used. The lattice, including the user specified risk factors and the associated probabilities, quantify risk and reward. The credit risk factor (i.e. obligor credit state) is described through a ratings-based model in this embodiment of the invention.

Behavioral models for various obligor and borrower options combine with detailed accounting relationships to yield state-contingent values for various cash flows and the valuation metrics at each node in the state-space lattice. The backward recursion technique allows the embedded options characteristic of many credit agreements to be evaluated.

The credit risk calibrations, as developed in the calibration engine 40 are loaded into the pricing engine 50 and are stored in a memory or database 30. These calibrations are indexed by time, industry sector, geography and obligor and take the form of a series of forward, annual risk-neutral transition matrices (e.g. 142 or 152, 122, 162). The credit instrument definitions including detailed terms and conditions information is loaded into pricing engine 50. Additional calibration data is utilized to specify a series of parameters that enable the various behavioral models for: (1) prepayment, (2) credit-line utilization, (3) grid pricing, and, (4) lender operating costs. A series of various valuation metrics are output from the pricing engine (e.g. as shown in FIG. 3) and are stored in the output reporting module in memory (e.g. 70 of FIG. 1) or are made available to the simulation engine 60 (FIG. 1) for further processing. In variant embodiments of the invention, the pricing engine may operate with simplified models without stochastic interest rates and/or stochastic spreads, for example.

Pricing engine 50 is comprised of a series of modules that perform the following functions:

(a) Defining State Space:

The process of defining state space 170 is used to specify an underlying credit model. The appropriate underlying risk factors (credit and market) are defined and specified, which will affect cash flows and credit instrument values. These factors are flexibly defined as either primitive factors such as abstract factors derived from Affine or HJM models, or financial factors derived from primitive factors. Examples of financial factors include discrete obligor ratings, term structures of risk-free rates, spreads, etc. Examples of primitive factors include ratings, two-factor interest rate models, systemic factors affecting spreads, etc. Mathematical models are implemented for processes that describe the evolution of primitive factors and transformations of primitive factors into financial factors.

(b) Generating State Space:

In the process of generating state space 180, the underlying credit models defining the state-space 170 for credit and market risk are used to generate future financial states using either efficient sampling techniques or discretization of these state-space processes. Various models may be used including multi-factor lattice construction, Monte Carlo or quasi Monte Carlo simulation techniques.

(c) Cash Flow Generation:

The module programmed to perform the process of generating cash flows 190 in pricing engine 50 develops the detailed cash flows for the various credit instruments under valuation. Cash flow generation algorithms are also tuned for pricing using option valuation modules, i.e., generating cash flows under different prepayment or credit state assumptions. Reusable libraries of advanced models and algorithms are used to correctly represent the detailed state contingent cash flows for a variety of credit instruments. Examples of how various credit instrument cash flows are evaluated are provided below.

Bond

Consider the simplest case of a bond. At each state and time step, some of the cash flows occur at the beginning of the period (in advance) and some occur at the end (in arrears).

The bond's cash flows are expressed as $$CF_B = \begin{cases} AC + CF_{PP} & \text{if prepayment occurs} \\ 0 & \text{otherwise} \end{cases} \quad (1)$$

$$CF_E = \begin{cases} 0 & \text{if prepayment occurs} \\ CF_I + CF_P & \text{if no prepayment and no default occurs} \\ (1-L)(CF_I + AC) & \text{if no prepayment and no default occurs} \end{cases} \quad (2)$$

where $CF_B$ denotes cash flow at the beginning of the period; $CF_E$ is the cash flow at the end of the period; AC is the commitment amount (which, for a bond, equals the principal outstanding); $CF_{PP}$ is a prepayment penalty; $CF_I$ is the cash interest payment; $CF_P$ is the principal repayment owed and L is the loss severity rate.

Figure 3B:
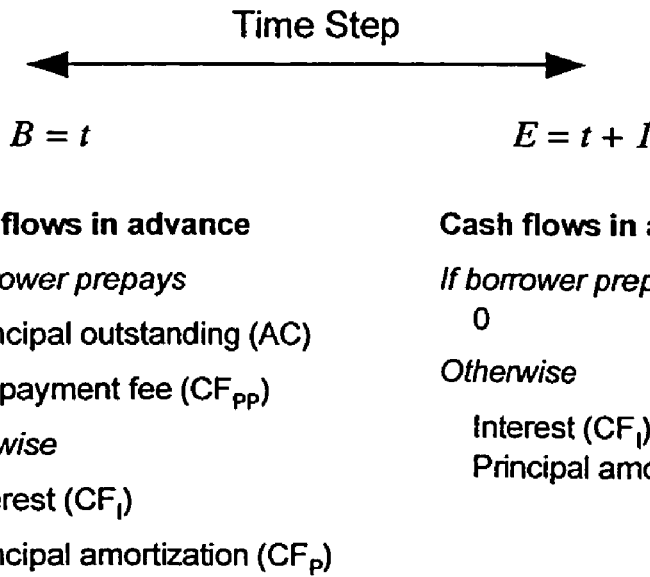
FIG. 3B is a timeline showing the timing of cash-flow components for a bond.

The above equations show that if the borrower prepays, the holder of the security immediately receives the outstanding principal plus any applicable prepayment fee. Otherwise, the cash flow received at the end of the period depends on whether the borrower defaults during the time step. If the borrower does not default before interest and principal come due, the holder of the security receives the amounts owed in full at the end of the period over which those charges accrue. Alternatively, if the borrower defaults, the holder of the security receives only a portion (1-L) of the interest and principal owed. The timing of these cash flow components is illustrated in FIG. 3B.

This method of representing default proceeds is called the recovery of par or legal claims approach. There are other conventional ways of modeling default losses. For example, in the recovery of treasury approach, losses (or recoveries) are expressed as a fraction of the value of a risk-free bond. In the recovery of market value approach, losses are expressed as a fraction of the value of the instrument just prior to default. The focus in the remainder of this section, however, will be on the legal claims approach.

For valuation, the cash flows at the beginning and end of the time step in the above equations (for $CF_B$ and $CF_E$) can be combined on a discounted basis, using the discount rate known in the state at the beginning of the time step. The discounted cash flows at the beginning of the period are then given by $$DCF = \begin{cases} AC + CF_{PP} & \text{if prepayment occurs} \\ (1+R)^{-1}(CF_I + CF_P) & \text{if no prepayment and no default occurs} \\ (1+R)^{-1}(1-L)(CF_I + AC) & \text{if no prepayment and no default occurs} \end{cases} \quad (3)$$

Here, DCF denotes discounted cash flow and R the applicable one-period (simple) discount rate, conditional on the state of the world at the beginning at the time step.

Assume that, at the beginning of the time step, default has not occurred and that, based on the time and state of the world, we know:

(i) The risk-neutral prepayment probability, $P_P$; and (ii) The risk-neutral probability that default occurs during the time step, conditional on no prior default and all prior information, $P_D$.

Then, the risk-neutral expected value of cash flows discounted over the time step can be obtained by taking the expectation in the above equation for DCF with respect to the (one-period) risk-neutral default and prepayment probabilities to derive the expected discounted cash flow of a bond at the beginning of the period:

$$ECF = (AC + CF_{PP}) \cdot P_P + [(1+R)^{-1}((1-P_D)(CF_I + CF_P) + P_D \cdot \quad (4)$$
$$(1-L)(CF_{IS} + AC))] \cdot (1-P_P)$$

This equation applies also to the risk-taking side of a total return swap with the bond as the underlying.

In the next two examples, the presentation is simplified by focusing only on expected discounted cash flows. In practice, however, all the conditional cash flows must be captured, without consolidation.

Credit-default Swap

The one-period expected discounted cash flow of a credit-default swap is given by $$ECF = CF_{PP} \cdot P_P + (CF_{DS} - CF_C - (1+R)^{-1} P_D \cdot L \cdot AC) \times (1 - P_P) \quad (5)$$

This equation can be understood as follows. A prepayment in this credit-default swap means that the protection buyer cancels the agreement. This event has a probability, $P_P$. In this case, the seller might receive a cancellation fee ($CF_{PP}$). Otherwise, if the contract continues, the buyer pays a premium at the start of the period ($CF_{DS}$) and the seller incurs servicing and monitoring costs ($CF_C$). If default occurs, the protection seller pays compensation ($L \cdot AC$) to the buyer at the end of the period, where AC is the committed amount.

Bank-credit Facility

Bank-credit facilities sometimes allow the borrower to obtain credit by choosing from among a set of instrument types. In the most general case, the borrower obtains credit by means of:

(i) A term loan;
(ii) A funded revolving line;
(iii) A letter of credit; and/or
(iv) Banker's acceptance.

Figure 3C:
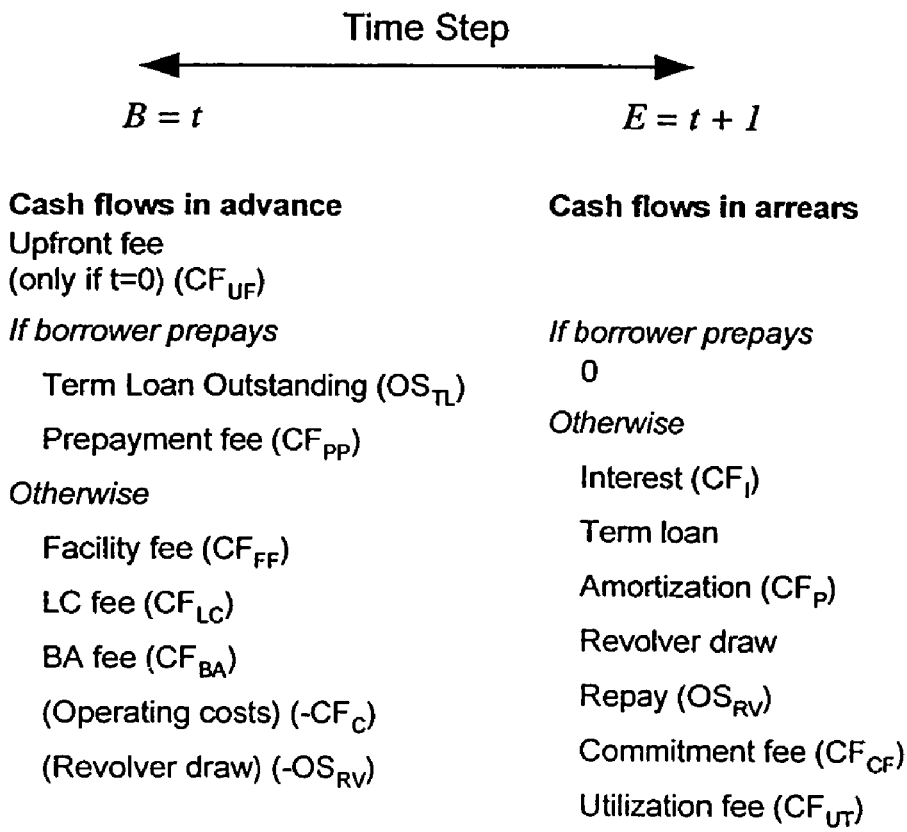
FIG. 3C is a timeline showing the timing of cash-flow components for a bank-credit facility.

Although it is rare for a single credit agreement to grant the borrower the option of choosing from among all of these instruments, the simultaneous use of all of these instruments leads to payments of interest and several different kinds of fees. The complexity of the resulting cash flows illustrates the required flexibility of the model. The timing of cash-flow components for a bank-credit facility is illustrated in FIG. 3C.

Figure 3D:
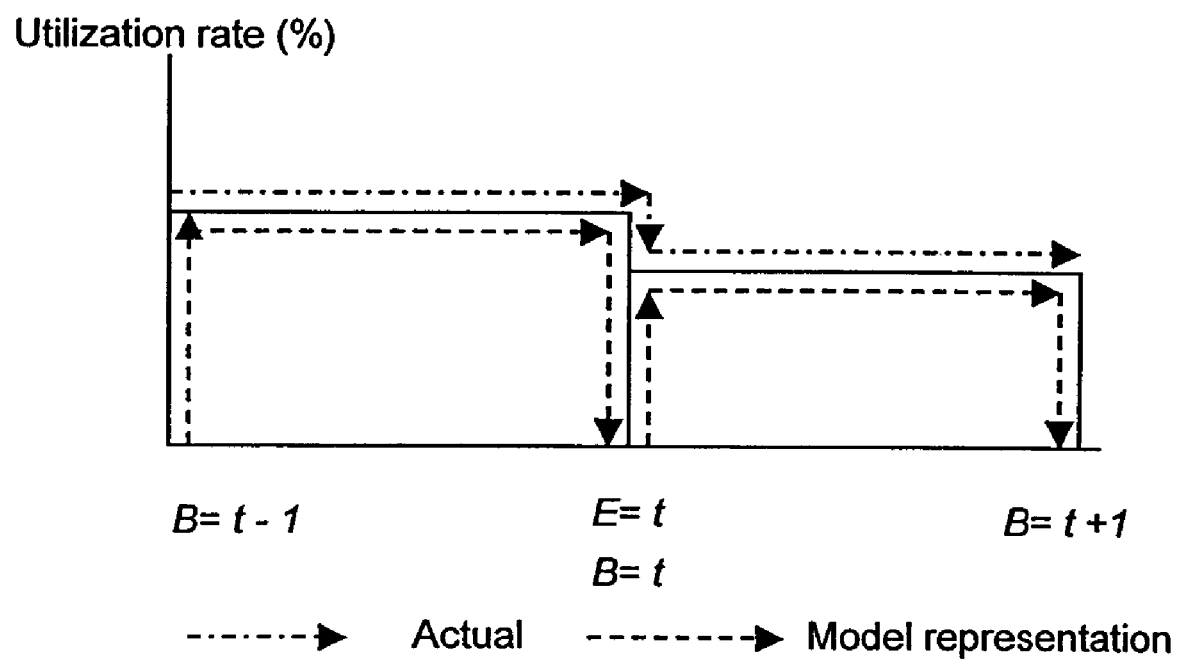
FIG. 3D is a graph modeling credit-line usage.

In bank-credit agreements other than straight, term loan facilities, the borrower has discretion, within limits, in choosing when to obtain credit, when to repay it and in what amounts. For modeling purposes, we assume that the borrower chooses the desired draw on a credit line at the beginning of each period and repays or cancels in full at the end of the period (as illustrated in FIG. 3D). This approach, in effect, treats the varying outstanding amounts in a credit line as a time series of differently sized one-period term loans. While this payment-and-draw pattern may not mirror the actual sequence of transactions, the state-contingent draws at the beginning of each time step offset any overstatement of repayment at the end of the preceding time step.

The tables below summarize the relevant balances, bank cash flows, pricing rates, cost rates and utilization rates for a bank-credit facility.

TABLE 1

Selected balances affecting bank loan cash flows and exposures

| Variable | Description | Revolving (Y/N) | Derivation |
|---|---|---|---|
| AC | Commitment amount | N | Loan attribute from contract |
| OS | Total outstanding amount | Y | $OS_{TL} + OS_{RV} + OS_{LC} + OS_{BA}$ |
| $OS_{TL}$ | Term loan outstanding amount | N | $RU_{TL} \times AC$ |
| $OS_{RV}$ | Revolver outstanding amount | Y | $RU_{RV} \times AC$ |
| $OS_{LC}$ | LC outstanding amount | Y | $RU_{LC} \times AC$ |
| $OS_{BA}$ | BA outstanding amount | Y | $RU_{BA} \times AC$ |

TABLE 2

Selected bank loan cash-flow components

| Variable name | Description | Timing (beginning or end of period) | Derivation |
|---|---|---|---|
| $CF_{UF}$ | Upfront fee | Beginning | Upfront fee rate × commitment amount |
| $CF_{PP}$ | Prepayment penalty | Beginning | Prepayment penalty rate × commitment amount |
| $CF_{FF}$ | Facility fee | Beginning | Facility fee rate × commitment amount |
| $CF_{LC}$ | LC fee | Beginning | LC fee rate × LC outstanding amount |
| $CF_{BA}$ | BA fee | Beginning | BA fee rate × BA outstanding amount |
| $CF_C$ | Operating costs | Beginning | Origination costs (t = 0 only) + servicing costs + collateral monitoring cost Origination costs = fixed origination costs + marginal origination cost rate × commitment amount Servicing costs = fixed servicing costs + marginal cost rate on outstanding × total outstanding amount + marginal cost rate on undrawn × (commitment amount − total outstanding amount) Collateral monitoring cost = fixed collateral monitoring cost + marginal cost rate on collateralized outstanding × collateralized outstanding amount |
| $CF_I$ | Interest | End | Contractual interest rate × (term loan outstanding amount + revolver outstanding amount) |
| $CF_{CF}$ | Commitment fee | End | Commitment fee rate × (commitment amount − total outstanding amount) |
| $CF_{UT}$ | Utilization fee | End | Total outstanding amount × blended utilization fee rate |
| $CF_P$ | Principal repaid (drawn) | End | Term loan outstanding end of period − term loan outstanding beginning of period; determined by loan contract |

TABLE 3

Selected pricing rates affecting bank loan cash flows

| Variable | Description | Derivation |
| --- | --- | --- |
| $R_I$ | Contractual interest rate | Contractually specified fixed rate or minimum rate of floating rate options |
| $R_{UF}$ | Upfront fee rate | Contractually specified |
| $R_{CF}$ | Commitment fee rate | Contractually specified |
| $R_{FF}$ | Facility fee rate | Contractually specified |
| $R_{LC}$ | LC fee rate | Contractually specified |
| $R_{BA}$ | BA fee rate | Contractually specified |
| $R_{UT}$ | Blended utilization fee rate | Computed from contractually specified utilization fee schedule and current utilization as determined by usage model |
| $R_{PP}$ | Prepayment fee rate | Contractually specified |

TABLE 4

Selected cost rates affecting bank loan cash flows

| Variable | Description | Derivation |
| --- | --- | --- |
| $FC_{ORIG}$ | Fixed cost of loan origination | Estimated from pricing of small loans |
| $MC_{ORIG}$ | Marginal origination cost rate | Imputed from secondary loan prices |
| $FC_{SERV}$ | Fixed cost of loan servicing | Imputed from pricing of small loans |
| $MC_{SERVOS}$ | Marginal servicing cost rate on total outstanding amount | Imputed from pricing of low-risk term loans |
| $MC_{SERVAC}$ | Marginal servicing cost rate on undrawn amount | Imputed from undrawn pricing of low-risk loans |
| $FC_{COLL}$ | Fixed cost of collateral monitoring | Imputed from pricing of small, secured loans |
| $MC_{COLL}$ | Marginal cost rate of collateral monitoring | Imputed from default rates and pricing of secured and unsecured loans |

TABLE 5

Selected utilization rates affecting bank loan cash flows

| Variable | Description | Derivation |
| --- | --- | --- |
| $RU_{TL}$ | Term loan outstanding as percentage of commitment amount | Loan attribute specified by contract |
| $RU_{RV}$ | Funded revolver outstanding as percentage of commitment amount | Determined by usage model as influenced by the relative costs and anticipated usage rates of the different draw options |
| $RU_{LC}$ | LC outstanding as percentage of commitment amount | Determined by usage model as influenced by the relative costs and anticipated usage rates of the different draw options |
| $RU_{BA}$ | BA outstanding as percentage of commitment amount | Determined by usage model as influenced by the relative costs and anticipated usage rates of the different draw options |
| $REU_{RV}$ | Anticipated revolver outstanding as percentage of commitment amount | Loan attribute entered by analyst |
| $REU_{LC}$ | Anticipated LC outstanding as percentage of commitment amount | Loan attribute entered by analyst |
| $REU_{BA}$ | Anticipated BA outstanding as percentage of commitment amount | Loan attribute entered by analyst |

The cash flows from a bank-credit facility include the following items paid at the beginning of the period:

(i) For a new facility (t=0), the borrower may owe an "upfront" fee, $CF_{UF}$; at other times, $CF_{UF}=0$.

(ii) In the case of prepayment, the borrower returns the outstanding principal, $OS_{TL}$, and pays any applicable prepayment penalty, $CF_{PP}$. Thus, with probability $P_P$, prepayment occurs and leads to a total cash flow of $$CF_{UF}+OS_{TL}+CF_{PP}$$

Note that, under this end-of-period revolver repayment convention, only the outstanding term loan amount is repaid at the beginning of the time step if prepayment occurs (see FIG. 3D). If no revolver draw occurs at the beginning of a period in which the borrower prepays, the repayment of the term loan reduces the outstanding balance to zero.

(iii) If the credit facility continues, the borrower owes, at the start of the period, any applicable facility fees, $CF_{FF}$, letters of credit fees, $CF_{LC}$, and banker's acceptance fees, $CF_{BA}$. The borrower's draw of funds on a credit line, $OS_{RV}$, and the lender's expenses, $CF_C$, occur in advance. These items create cash outflows, which appear as negative entries. Thus, with probability $1-P_P$, there is a total beginning-of-period cash flow of $$CF_{UF}-CF_{FF}+CF_{LC}+CF_{BA}-OS_{RV}-CF_C$$

If the credit facility continues, several additional cash flows occur in arrears and the amounts realized depend on whether the borrower defaults:

(iv) Interest, $CF_I$, commitment fees, $CF_{CF}$, utilization fees, $CF_{UT}$, and principal repayment, $CF_P$, come due at the end of a period. Also, by modeling convention, the funded revolving amount, $OS_{RV}$, is paid at the end of a period. Thus, in the absence of default, the total cash flow at the end of the period is $$CF_I+CF_{CF}+CF_{UT}+CF_P+OS_{RV}$$

(v) In default, we assume that the borrower pays only the portion (1-L) of those amounts owed. The loss-in-event-of-default rate (L) reflects the seniority of the obligation, strength of covenant protection, the value and type of any collateral and the protection afforded by subordinated debt. Also, in default, the creditor receives only the portion (1-L) of the principle outstanding. Thus, all together, the cash flows at the end of the period if default occurs are $$(1-L)(CF_I+CF_{CF}+CF_{UT}+CF_P+OS_{RV})$$

(vi) For credit lines with commitments available (i.e., when $AC>OS_{TL}$), the outstanding principal can rise as the borrower goes into default. The loan equivalency of the commitment, LEQAC, and the normal utilization rate, REU, determine the amount of this additional draw. Specifically, the funded outstanding amount in default is the sum of the normally drawn amount (AC×REU) and the normally undrawn amount, weighted by the LEQAC factor (AC·(1−REU)·LEQAC). The additional draw in default is then given by the expected outstanding amount in default, which is the sum of two terms $$(AC \cdot REU + AC \cdot (1-REU) \cdot LEQAC)$$

less the funded outstanding balance at the beginning of the period, $$OS_{TL} + OS_{RV}$$

This contributes to an additional cash-flow loss at the end of the period $$L[AC(REU+(1-REU)LEQAC)-OS_{TL}-OS_{RV}]$$

This expression adjusts for the additional draw on a credit line that frequently happens as a borrower goes into default. For time steps as long as one year, this adjustment is needed to represent accurately the amount that will be outstanding and thus vulnerable to loss in default. For time steps as short as one month or one quarter, the LEQAC adjustment may be inappropriate.

Suppose that, during the year leading up to default, borrowers make additional draws of about 40% of the original commitment less the amount typically drawn; then, for an annual time step, LEQAC=40%. Assuming the normal utilization rate REU=30% (which implies a normally undrawn fraction of 1−REU=70%), the expected usage in default is 0.30+0.70×0.40=0.58. The additional draw in default is thus $0.58 - OS_{TL} - OS_{RV}$.

The loan equivalency factor, LEQAC, measures the proportion of normally undrawn balances that have been drawn and thus are vulnerable to loss in the event of default. Thus, it reflects two competing effects: the deteriorating borrower's attempt to draw additional funds to cover an increasing cash-flow deficiency, and the lender's attempt to reduce the commitment available to a deteriorating borrower who predictably violates some loan covenants.

Weighting by the appropriate probabilities and discounting the cash flows occurring at the end of the period, all of these components are consolidated to obtain the expected discounted cash flow of the credit facility:

$$\begin{aligned}
ECF = {} & CF_{UF} + OS_{TL} + \\
& CF_{PP} \cdot P_P + [(CF_{UF} + CF_{FF} + CF_{LC} + CF_{BA} - OS_{RV} - CF_C) + \\
& (1+R)^{-1}\{(1-P_D)(CF_I + CF_{CF} + CF_{UT} + CF_P + OS_{RV}) + \\
& P_D(1-L)(CF_I + CF_{CF} + CF_{UT} + OS_{TL} + OS_{RV}) - \\
& P_D \cdot L \cdot (AC \cdot (REU + (1-REU) \cdot LEQAC) - \\
& \qquad OS_{TL} - OS_{RV})\}] \times (1-P_P)
\end{aligned} \quad (6)$$

The LEQAC factor controls explicitly the usage of the credit line in default. Moreover, it also controls the maximum usage of the credit line in non-default. Thus, it also affects several cash flows and outstanding amounts in the above equation, through the credit line usage model. Since one expects that the incentive to draw will be highest as the borrower goes into default, our assumptions do not allow usage in default to rise higher than that in a non-default situation.

Note that LEQAC measures the exposure in default as a fraction of the original, and not of the terminal, commitment. Its value can be imputed from market pricing of undrawn commitments or from past evidence on the usage of normally undrawn amounts in default. For example, suppose that market credit spreads on undrawn balances average about 25% of those on drawn balances. This motivates a LEQAC value of 25%. Alternatively, suppose that past data show that, in default, borrowers end up drawing about 50% of the commitment that was unused early in the life of the facility before any substantial decline in creditworthiness. This suggests LEQAC=50%. Studies typically estimate LEQAC well below 100% and the Bank for International Settlements capital adequacy guidelines (BIS 1988) prescribes a value of 50% for undrawn commitments extended for one year or more.

The concept of a loan equivalency factor is familiar to practitioners exposed to BIS and internal capital allocation schemes. An alternative and more direct approach to using LEQAC is to model the credit line that the lender predictably achieves as the borrower's risk rating degrades. This can be seen as a lender's "option to reduce the line." Thereafter, the borrower is free to use the whole amount of the reduced commitment.

Several standard accounting relationships and other formulae ultimately tie the cash-flow components shown above to model inputs that describe the pricing and structure of the credit facility, market conditions and borrower behavior. Most of these primary relationships determine cash flows as the product of rates and balances. For example:

(i) The interest payable, $CF_I$, equals the product of the contractual interest rate, $R_I$, and the outstanding funded balance, using the proper day count and compounding conventions.

(ii) The interest rate, $R_I$, equals either a specified fixed rate or the current value of the relevant floating rate computed as the sum of a base rate and a spread.

(iii) In the case of a choice among varied floating rates, the option that provides the lowest rate, or the lowest rate that falls between an interest rate floor and ceiling, determines the floating rate.

(iv) The spreads valid at the current time and state depend on the pricing grid, if there is one. Similar considerations arise in determining other cash-flow components.

Referring again to FIG. 3A and to the description of pricing engine 50, particular attention is paid to modeling embedded options in loans and other credit instruments, including the economic and behavioral assumptions driving prepayment, term out options, credit line utilization, pricing grids and multi-instrument facilities. We describe the option valuation models for prepayment and credit line utilization in greater detail below.

Prepayment

It seems plausible to assume that a borrower will exercise the option to prepay a loan instrument if the market value of the loan, conditional on it continuing, VNM, rises high enough above par to pay for Any prepayment penalty, given by a prepayment rate times the committed amount, $R_{PP} \cdot AC$ Refinancing transactions costs of the borrower, given by fixed and variable costs of searching for and negotiating a new loan, $FTC_{PP} + MTC_{PP} \cdot AC$ Origination costs, which are the (fixed and variable) costs that an efficient lender in the primary market incurs in originating a new facility, $FC_{ORIGM} + MC_{ORIGM} \cdot AC$.

Combining these three items, we obtain the total transaction cost of prepayment ($TC_{PP}$):

$$TC_{PP} = R_{PP} \cdot AC + FTC_{PP} + MTC_{PP} \cdot AC$$

$$= FC_{ORIGM} + MC_{ORIGM} \cdot AC$$

We assume that, in a given state of the world, the borrower will prepay if, in switching to a new loan with a competitive value of par in the secondary market, the savings relative to the existing above-par loan more than cover the transactions cost. Thus, the probability of prepayment in a state of the world, $P_P$, can assume only the values of zero or one and simply becomes an index of the prepayment event $$P_p = \begin{cases} 1 & \text{if } VNM - OS_{TL} > TC_{PP} \\ 0 & \text{otherwise} \end{cases}$$

Although one could more generally model Pp as a continuous monotonic function of the predicted prepayment savings (VNM–$OS_{TL}$–$TC_{PP}$), in practice, it is difficult to obtain data to calibrate this function to actual borrower behavior.

As an example, consider the workings of the prepayment model in the case of a $10 million facility. Suppose that as a result of an upgrade in creditworthiness, the facility's NPV in the market, conditional on no prepayment, rises to $150,000. Assume that, in refinancing the loan, an efficient lender will incur origination costs of $40,000 and that the borrower will incur search and negotiation costs of $15,000. Assume, further, that there is no prepayment fee. The total transaction cost of $55,000 falls short of the $150,000 gross savings that the borrower can realize from refinancing. The model will predict prepayment.

To implement this approach and ultimately determine the credit facility's value to a particular lender, both the lender's and the market's costs of originating and of servicing loans must be estimated. "Market" costs refers to those of competitive providers of credit. Borrower costs of transacting a new loan must also be determined. These estimates can come from various sources as may be available to the user.

Credit Line Utilization

In bank-credit agreements other than straight, term-loan facilities, the borrower has the option to choose the usage of the line. Obviously, the line utilization is realized only in the event that the borrower does not prepay the facility. The usage of a line influences both the payments that the borrower owes to the creditor as well as the amount of exposure that the creditor bears. The usage of the line affects several cash flows and outstanding amounts as described below.

The amount outstanding as a term loan, $OS_{TL}$, is fixed by the loan contract. Any remaining commitment above that amount is available to the borrower, assuming compliance with the loan covenants. The compliant borrower may use this amount in varying degrees from 0% to 100%. The usage model determines two components:

The overall usage, RUACA, of the available commitment

The relative usage of the different instrument options: the funded revolver, the letter of credit and the banker's acceptance.

The overall and relative utilization rates determine, (in equation (6) for ECF above), cash flows $CF_{LC}$, $CF_{BA}$, $CF_C$, $CF_I$, $CF_{CF}$ and $CF_{UT}$, as well as the outstanding amounts $OS_{RV}$, $OS_{LC}$ and $OS_{BA}$. The cash flows are obtained by multiplying contractual pricing rates by the corresponding drawn (outstanding) or undrawn (commitment less outstanding) balances. The outstanding amounts also influence operating costs and exposure.

Both of these option valuation models are implemented in a modular valuation architecture of pricing engine 50 and are calibrated to market prices for the credit state variable. Detailed instrument-specific representations of cash flows for the credit instruments of interest are provided for by the present invention.

(d) Invoking Pricing and Valuation Algorithms:

Referring again to FIG. 3A and to the description of pricing engine 50, detailed algorithms are used to generate prices and values from cash flows either at current or future times in the pricing and valuation process 200. Present value techniques such as backward propagation in lattices and numerical integration in Monte Carlo can be used. Various valuation attributes 202 are estimated and output, and may include, for example, intermediate and future prices, MTM values, sensitivities, option stripped prices cash flow statistics and cash flow streams, par yields, credit exposures, MtF data etc.

Parallel processing allows system 10 to use multiple pricing engines to populate MtF tables. Extensible and reusable libraries may be used at each level in the architecture of system 10. The applications of a pricing engine 50 of system 10 may include, for example:

(i) Portfolio loan MtM analysis: pricing engine results are passed directly to the risk engine for portfolio analysis;

(ii) Portfolio credit risk and capital: pricing engine results are inputs to simulation an portfolio credit risk engines; and (iii) Front office credit valuation analysis: includes loan pricing, structuring, marginal capital limits transfer pricing and "what if" analysis.

Par Spreads

In addition to calculating a credit facility's NPV, with the facility's pricing and structure known, pricing engine 50 may also be adapted to calculate the reverse problem in an embodiment of the present invention. This implementation determines a spread or, for a revolving credit line, a pair of spreads (drawn and undrawn) that, given the facility's structure, imply a particular NPV value usually set to zero (par).

The calculation involves finding one or, in the case of revolving lines, two roots. The procedure applies Newton's method as the main approach. One-sided approximations are used in estimating the required derivatives. The procedure starts by bracketing the root using two extreme values. The bracketing is maintained throughout the iterative procedure. If a Newton step falls outside the current bracket, a bisection step is performed. This always guarantees progress toward the root. The bracketing also leads to a good initial guess for the root using a straight-line approximation.

A particular convention is used for defining par spreads in the case of grid pricing. As noted earlier, contractual spreads, commitment fees, and facility fees sometimes vary with changes in the borrower's credit worthiness as measured by risk rating or one or more financial ratios. In complex deals, these grids may change over time. To determine par pricing in these cases, it is assumed that some of the grid pricing elements remain fixed up to a translation, a single parameter delta that remains the same over the loan's term. By this method, par-price calculations are reduced to one-parameter searches. The search parameters correspond to the translations (deltas) applied to the individual grids.

The capabilities of pricing engine 50 in preferred embodiments of the invention include detailed models for prepayment options and credit line utilization. To correctly quantify par credit spreads using the iterative search process described above, four separate par spread procedures may be implemented:

(i) One-Pass Procedure without a Prepayment Option: This is the simplest case for a par drawn delta calculation. The root-finding procedure is used, with a built-in algorithm for creating an initial guess.

(ii) One-Pass Procedure with a Prepayment Option: A prepayment option introduces non-linear effects into the underlying value function. In this case, the root-finding solution procedure is refined, by starting with a lower par drawn delta for the loan agreement as determined without the prepayment option.

(iii) Two-Pass Procedure without a Prepayment Option: Revolving credit line agreements have two par price components; one associated with the drawn amount (i.e., spread) and the other associated with the undrawn amount (i.e., commitment fee). For revolving lines of a credit, two passes through the search process are utilized to identify the drawn and undrawn spread components individually.

(iv) Two-Pass Procedure with a Prepayment Option: In the case of a revolving line with prepayment option, a procedure is used that combines the one-pass procedure with prepayment and the two-pass procedure without prepayment.

Application to a Mark-to-Future Framework

As indicated with reference to FIG. 1, system 10 can be adapted to generate Mark-to-Future (MtF) data for use in simulation and risk management applications, both by components within system 10 of the present invention, and external applications. MtF data can be generated from the output of various components of system 10, including pricing engine 50, and simulator and portfolio credit risk engine 60.

In an application of the present invention to Mark-to-Future, engines 50 can work in parallel to produce a MtF cube. The data in the cube can by used in many ways by risk engine 90, and by other applications. The processes involved in valuing credit instruments can be costly (i.e. time-consuming), and ingenious algorithms to perform simulations for stress testing and statistical risk measurement are often required to perform such functions more efficiently. The pricing engine can be leveraged to devise fast computational algorithms. This is enhanced by the choice of a rating-based pricing infrastructure. In addition to the MtM of loans, intermediate results and other calculated parameters can be used to speed up simulations. For example, in standard portfolio credit risk applications (deterministic interest rates) and using lattice valuation, MtF values of loans can be stored at each rating at horizon dates by the pricing engine (essentially producing the exposure tables—intermediate computations of the pricing function; if the lattice also contains interest rates or other stochastic factors, then the average values over those stochastic variables per rating in the lattice must be stored, and the time steps in the lattice and the risk measurement horizon must be co-ordinated). Also, in integrated market and credit portfolio credit risk applications, a proper low-dimensional grid can be defined, and MtF values of each loan of interest at each note in the grid can be stored (e.g. a 3-dimensional grid may contain rating and two abstract factors for interest rates and spreads). Similar techniques can also be applied for other simulation exercises (e.g. stress testing).

In such applications, generated MtF data may be used to populate MtF cubes generated under a Mark-to-Future framework. Details of this MtF framework and the underlying methodology are explained in further detail below.

Mark-to-Future Methodology

At the core of the MtF framework is the generation of a three-dimensional MtF Cube. The MtF Cube is built in steps.

Figure 4A:
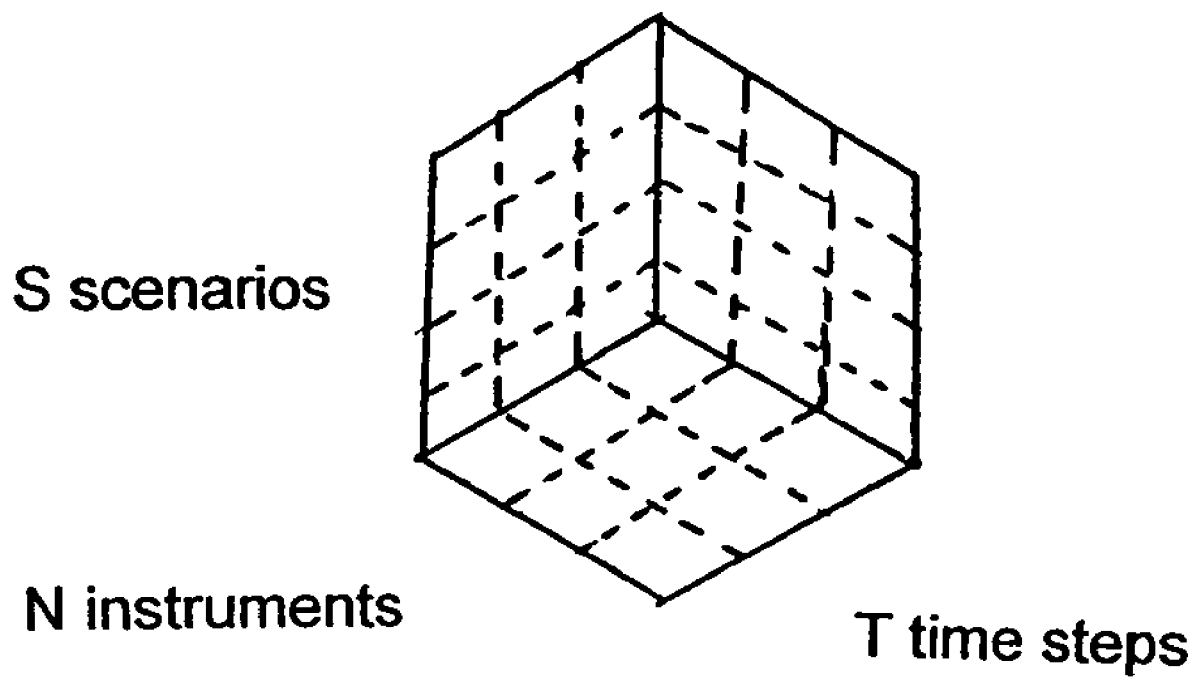
FIG. 4A is a diagram illustrating a typical Mark-to-Future (MtF) cube.

First, a set of scenarios is chosen. A scenario is a complete description of the evolution of key risk factors over time. In the second step, a MtF table is generated for a given financial instrument. Each cell of the MtF table contains the computed MtF value for that financial instrument under a given scenario at a specified time step. A MtF Cube consists of a set of MtF tables, one for each financial instrument of interest. FIG. 4A illustrates a representative MtF Cube.

In certain applications, a cell of the MtF Cube may contain other measures in addition to its MtF value, such as an instrument's MtF delta or MtF duration. In the general case, each cell of a MtF Cube contains a vector of risk-factor dependent measures for a given instrument under a given scenario and time step. In some applications, the vector may also contain a set of risk-factor dependent MtF cash flows for each scenario and time step. For ease of exposition, however, the typical case in which each cell contains only the instrument's MtF value will be primarily considered.

Key to the MtF framework is the premise that knowledge of portfolio holdings is not required to generate a MtF Cube: a single MtF Cube accommodates the risk/reward assessment of multiple portfolios simultaneously. A MtF Cube provides a pre-computed basis that maps into all portfolios of financial products. Since the MtF Cube contains all of the necessary information about the values of individual instruments, a portfolio MtF table can be created simply as a combination of those basis instruments. All risk/reward analyses and portfolio dynamics for any set of holdings are, therefore, derived by post-processing the contents of the MtF Cube. For example, the risk/reward assessment of a portfolio regime such as a roll-over strategy or an immunization strategy is captured strictly through the mapping of the MtF Cube into dynamically rebalanced positions.

The MtF methodology for risk/reward assessment can be summarized by the following six steps, each of which can be explicitly configured as an independent component of the overall process:

The first three steps build the MtF Cube:
1. Define the scenario paths and time steps.
2. Define the basis instruments.
3. Simulate the instruments over scenarios and time steps to generate a MtF Cube.

The next three steps apply the MtF Cube:
1. Map the MtF Cube into portfolios to produce a portfolio MtF table.
2. Aggregate across dimensions of the portfolio MtF table to produce risk/reward measures.
3. Incorporate portfolio MtF tables into advanced applications.

Figure 4B:
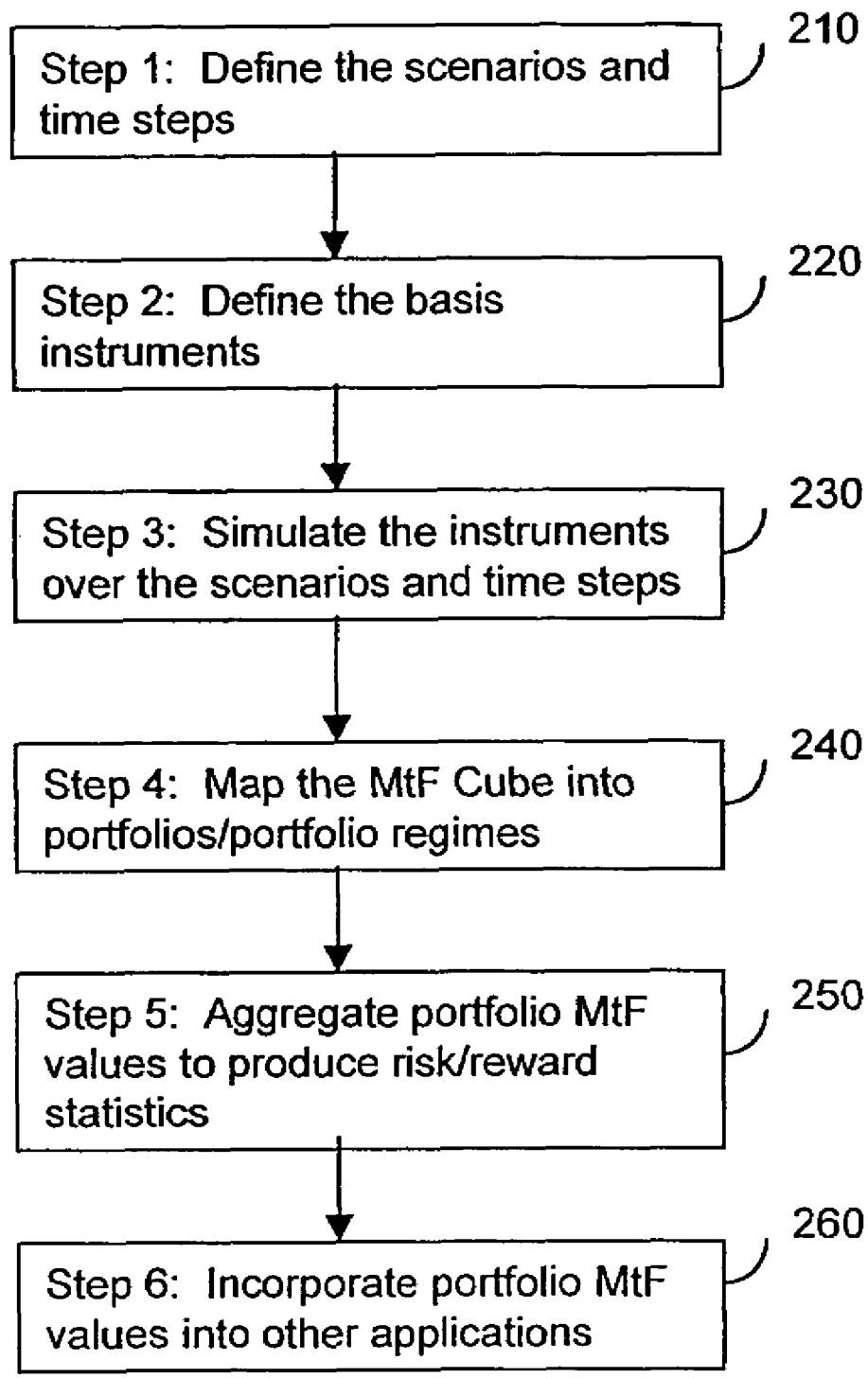
FIG. 4B is a flowchart illustrating the steps in a MtF methodology.

The simulation of the MtF Cube in Step 1 to Step 3 above represents the only computationally intensive stage of the process and, significantly, need be performed only once. These steps represent the pre-Cube stage of MtF processing. In contrast, Step 4 to Step 6 represent post-processing exercises, which can be performed with minimal additional processing (Step 4 and Step 5) or slightly more complex processing (Step 6). These steps represent the post-Cube stage of MtF processing. FIG. 4B provides a flowchart illustrating the six steps of the MtF methodology, and is explained in further detail below.

The decoupling of the post-Cube stage from the pre-Cube stage is a key architectural benefit of the Mark-to-Future framework. A single risk service may generate a MtF Cube (pre-Cube) that can be distributed to multiple risk clients (post-Cube) for a variety of customized business applications. This generates leverage as a common risk/reward framework and can be widely distributed throughout the organization as well as to external organizations for user-specific analyses.

The Six Steps of Mark-to-Future

This section provides a step-by-step overview of the fundamentals of the MtF framework, and an example of an implementation of this method and why it represents a standard for simulation-based risk/reward management can be found in pending U.S. patent application Ser. No. 09/811,684, the contents of which are herein incorporated by reference. Mark-to-Future is a framework designed not merely to measure risk and reward but, significantly, to manage the trade-off of risk and reward. The following steps are performed, as shown in FIG. 4B:

Step 1 (marked as 210 in FIG. 4B): The definition of scenarios.

In the MtF framework, scenarios represent the joint evolution of risk factors through time and are, thus, the ultimate determinant of future uncertainty. The explicit choice of scenarios is the key input to any analysis. Accordingly, scenarios directly determine the future distributions of portfolio MtF values, the dynamics of portfolio strategies, the liquidity in the market and the creditworthiness of counterparties and issuers. This step discusses scenarios in risk management, their importance, and various methodologies used to generate them.

Step 2 (marked as 220 in FIG. 4B): The definition of basis instruments.

Portfolios consist of positions in a number of financial products, both exchange traded and over-the-counter (OTC). The MtF Cube is the package of MtF tables, each corresponding to an individual basis instrument. A basis instrument may represent an actual financial product or an abstract instrument. As the number of OTC products is virtually unlimited, it is often possible to reduce substantially the number of basis instruments required by representing the MtF values of OTC products as a function of the MtF values of the abstract instruments.

Step 3 (marked as 230 in FIG. 4B): The generation of the MtF Cube.

The MtF Cube consists of a set of MtF tables each associated with a given basis instrument. The cells of a MtF table contain the MtF values of that basis instrument as simulated over a set of scenarios and a number of time steps. These risk factors, scenario paths and pricing functions are simulated for the MtF values at this stage.

Step 4 (marked as 240 in FIG. 4B): The mapping of the MtF Cube into portfolios and portfolio strategies.

From the MtF Cube, multiple portfolio MtF tables can be generated as functions of the MtF tables associated with each basis instrument. Key to the MtF framework is the premise that a MtF Cube is generated independently of portfolio holdings. Any portfolio or portfolio regime can be represented by mapping the MtF Cube into static or dynamically changing portfolio holdings.

Step 5 (marked as 250 in FIG. 4B): The estimation of risk/reward measures derived from the distribution of portfolio MtF values.

The portfolio MtF table resulting from the mapping of the MtF Cube into a given portfolio or portfolio strategy contains a full description of future uncertainty. Each cell of the portfolio MtF table contains a portfolio MtF value for a given scenario and time step. The actual risk and reward measures chosen to characterize this uncertainty can be arbitrarily defined and incorporated strictly as post-processing functionality in the post-Cube stage.

Step 6 (marked as 260 in FIG. 4B): More advanced post-processing applications using the MtF Cube.

MtF Cubes may serve as input for applications more complex than calculating simple risk/reward measures. The properties of linearity and conditional independence on each scenario can be used to obtain computationally efficient methodologies. For example, conditional independence within a particular scenario is a powerful tool that allows the MtF framework to incorporate effectively processes such as joint counterparty migration. In addition, portfolio or instrument MtF tables may be used as input to a wide variety of scenario-based risk management and portfolio optimization applications.

The present invention has been described with regard to specific embodiments. However, it will be obvious to persons skilled in the art that a number of variants and modifications can be made without departing from the scope and spirit of the invention defined in the claims appended hereto.

The invention claimed is:

1. A no-arbitrage-based system for valuing one or more credit instruments, said system comprising:
   a) a database having a machine readable storage medium for storing credit instrument data;
   b) a first calibration engine connected to said database, wherein said first calibration engine generates calibration parameters from said credit instrument data and current market data, said credit instrument data comprising market data;
   C) a second pricing engine connected to said database and said first calibration engine, wherein said second pricing engine is configured to use said calibration parameters to value said one or more credit instruments according to no-arbitrage financial principles, wherein at least one of a net present value and a par-spread is calculated for each of said one or more credit instruments using current market data;
   d) a third engine connected to said second pricing engine for performing simulation-based computations in which a plurality of scenarios are applied to market data to generate a plurality of valuation and exposure measures;
   e) a fourth risk engine connected to said second pricing engine and said third engine for computing a plurality of risk and reward metrics from said valuation and exposure measures; and
   f) a report generator connected to said fourth risk engine for generating reports for use in managing risk; and
   g) wherein acts performed by said first calibration engine, said second pricing engine said third engine, said fourth risk engine and said report generator are configured to execute on a computer.

2. The system as claimed in claim 1, wherein at least one of said one or more credit instruments is a loan.

3. The system as claimed in claim 1, further comprising at least one input data module for storing data relating to credit instruments in said database.

4. The system as claimed in claim 1, further comprising a portfolio hierarchy server.

5. The system as claimed in claim 1, wherein said first calibration engine comprises:
   a) a first module for generating one or more basis instruments from input data relating to said one or more credit instruments, wherein said input data comprises at least one of prices, ratings, sectors, and terms and conditions;

b) a second module for generating a first term structure of risk-free zero prices and a risk-neutral process for interest rates from said one or more basis instruments;

c) a third module for generating one or more basic spread matrices from said one or more basis instruments and said first term structure of risk-free zero prices;

d) a fourth module for generating a second term structure of risk-neutral transition matrices and at least one smoothed credit spread matrix using said first term structure of risk-free zero prices, said module also configured to develop generators using a transition matrix manager;

e) a fifth module for generating a third term structure of risk-neutral transition matrices for a specific named obligor from said at least one smoothed credit spread matrix, said first term structure of risk-free zero prices, and said second term structure of risk-neutral transition matrices; and f) a sixth module for generating a plurality of spread volatility matrices.

6. The calibration engine of claim 5, wherein at least one of said modules of said calibration engine generates data subsequently stored in a Mark-to-Future cube.

7. The system of claim 1, wherein said second pricing engine comprises:

a) a first module for defining a state space;

b) a second module for generating a state space by modeling the underlying economic behavior driving the exercise of embedded options and other structural features of said plurality of credit instruments;

c) a third cash flow generation module for generating cash flows for said plurality of credit instruments, whereby said credit instruments may be subject to different prepayment or credit state assumptions; and d) a fourth module connected to said third cash flow generation module for generating a plurality of valuation attributes from said generated cash flows.

8. The system of claim 1, wherein the net present value of a credit instrument is calculated by performing a valuation of a plurality of cash flows for the credit instrument.

9. The system of claim 8, wherein said valuation of said plurality of cash flows is performed using a lattice valuation technique.

10. The system of claim 8, where said valuation of said plurality of cash flows is performed using a Monte Carlo simulation technique.

11. The system of claim 1, wherein the par spread of a credit instrument is calculated by determining one or more spreads such that the net present value of the credit instrument equals a specified value.

12. A no-arbitrage-based system for valuing one or more credit instruments, said system comprising:

a) a database having a machine readable storage medium for storing credit instrument data;

b) a first calibration engine connected to said database, wherein said first calibration engine generates calibration parameters from said credit instrument data and current market data, said credit instrument data comprising market data;

c) a second pricing engine connected to said database and said first calibration engine, wherein said second pricing engine is configured to use said calibration parameters to value said one or more credit instruments according to no-arbitrage financial principles, wherein at least one of a net present value and a par-spread is calculated for each of said one or more credit instruments using current market data;

d) a third engine connected to said second pricing engine for performing simulation-based computations in which a plurality of scenarios are applied to market data to generate a plurality of valuation and exposure measures;

e) a fourth risk engine connected to said second pricing engine and said third engine for computing a plurality of risk and reward metrics from said valuation and exposure measures; and f) a report generator connected to said fourth risk engine for generating reports for use in managing risk, wherein the second pricing engine is configured to produce at least one risk-neutral transition matrix; wherein acts performed by said first calibration engine, said second pricing engine said third engine, said fourth risk engine and said report generator are configured to execute on a computer.

13. The system of claim 1, wherein the first calibration engine is further configured to classify, filter, create an interest rate model, a prior yield curve model and develop a rating based model construction process.

14. The system of claim 13, wherein the rating based model construction process uses a multiple transformation function for empirical transition matrices.

15. The system of claim 14, wherein the multiple transformation function is one of a Jarrow-Lando-Turnbull and a Jijima & Komoribayashi model.

16. A no-arbitrage-based system for valuing one or more credit instruments, said system comprising:

a) a database having a machine readable storage medium for storing credit instrument data;

b) a first calibration engine connected to said database, wherein said first calibration engine generates calibration parameters from said credit instrument data and current market data, said credit instrument data comprising market data, the first calibration engine having a first module for generating one or more basis instruments from input data relating to said one or more credit instruments, wherein said input data comprises at least one of prices, ratings, sectors, and terms and conditions, a second module for generating a first term structure of risk-free zero prices and a risk-neutral process for interest rates from said one or more basis instruments, a third module for generating one or more basic spread matrices from said one or more basis instruments and said first term structure of risk-free zero prices, a fourth module for generating a second term structure of risk-neutral transition matrices and at least one smoothed credit spread matrix using said first term structure of risk-free zero prices, said module also configured to develop generators using a transition matrix manager, a fifth module for generating a third term structure of risk-neutral transition matrices for a specific named obligor from said at least one smoothed credit spread matrix, said first term structure of risk-free zero prices, and said second term structure of risk-neutral transition matrices, and a sixth module for generating a plurality of spread volatility matrices;

c) a second pricing engine connected to said database and said first calibration engine, wherein said second pricing engine is configured to use said calibration parameters to value said one or more credit instruments according to no-arbitrage financial principles, wherein at least one of a net present value and a par-spread is calculated for each of said one or more credit instruments using current market data, having a first module for defining a state space, a second module for generating a state space by modeling the underlying economic behavior driving the exercise of embedded options and other structural features of said plurality of credit instruments, a third cash flow generation module for generating cash flows for said plurality of credit instruments, whereby said credit instruments may be subject to different prepayment or credit state assumptions, and a fourth module connected to said third cash flow generation module for generating a plurality of valuation attributes from said generated cash flows, d) a third engine connected to said second pricing engine for performing simulation-based computations in which a plurality of scenarios are applied to market data to generate a plurality of valuation and exposure measures;

e) a fourth risk engine connected to said second pricing engine and said third engine for computing a plurality of risk and reward metrics from said valuation and exposure measures; and f) a report generator connected to said fourth risk engine for generating reports for use in managing risk, and g) wherein acts performed by said first calibration engine, said second pricing engine said third engine, said fourth risk engine and said report generator are configured to execute on a computer.

* * * * *

UNITED STATES PATENT AND TRADEMARK OFFICE
CERTIFICATE OF CORRECTION

PATENT NO.        : 7,526,446 B2                                            Page 1 of 1
APPLICATION NO.   : 10/051905
DATED             : April 28, 2009
INVENTOR(S)       : Aguais et al.

It is certified that error appears in the above-identified patent and that said Letters Patent is hereby corrected as shown below:

On the title page, at item (54) and in the Specification, Column 1, title, replace "SYSTEM AND METHODS FOR VALUING AND MANAGING THE RISK OF CREDIT INSTRUMENT PORTFOLIOS" with -- VALUING AND MANAGING THE RISK OF CREDIT INSTRUMENT PORTFOLIOS --, In the Claims Column 28, line 54, replace "said second pricing engine said third engine," with -- said second pricing engine, said third engine, --, Column 29, line 12, replace "said module" with -- said fourth module --, Column 30, lines 16 and 17, replace "said second pricing engine said third engine," with -- said second pricing engine, said third engine, --, and Column 32, line 10, replace "said second pricing engine said third engine," with -- said second pricing engine, said third engine, --.

Signed and Sealed this
Sixth Day of May, 2014

Michelle K. Lee
*Deputy Director of the United States Patent and Trademark Office*